US010173486B1

(12) United States Patent
Lee et al.

(10) Patent No.: US 10,173,486 B1
(45) Date of Patent: Jan. 8, 2019

(54) METHOD AND APPARATUS FOR AUTOMATICALLY DEDUCING A TRAILER IS PHYSICALLY COUPLED WITH A VEHICLE

(71) Applicant: Samsara Networks Inc., San Francisco, CA (US)

(72) Inventors: Kenneth Kai Tai Lee, Bayside, NY (US); James Michael Rowson, San Francisco, CA (US); John Bicket, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 15/813,873

(22) Filed: Nov. 15, 2017

(51) Int. Cl.
| | |
|---|---|
| *G06Q 50/30* | (2012.01) |
| *B60D 1/64* | (2006.01) |
| *G08G 1/00* | (2006.01) |
| *G01S 5/00* | (2006.01) |

(52) U.S. Cl.
CPC .............. *B60D 1/64* (2013.01); *G01S 5/0027* (2013.01); *G06Q 50/30* (2013.01); *G08G 1/202* (2013.01); *H04B 2203/5441* (2013.01); *H04B 2203/5458* (2013.01)

(58) Field of Classification Search
CPC ........ B60D 1/64; G01S 5/0027; G08G 1/202; H04B 2203/5458; H04B 2203/5441; G06Q 50/00; G06Q 50/28–50/30
See application file for complete search history.

(56) References Cited

U.S. PATENT DOCUMENTS

| | | | |
|---|---|---|---|
| 5,969,433 A | * | 10/1999 | Maggiora ............... B60R 25/04 180/287 |
| 6,142,372 A | | 11/2000 | Wright |
| 6,331,825 B1 | | 12/2001 | Ladner et al. |
| 6,687,609 B2 | | 2/2004 | Hsiao et al. |
| 7,307,514 B2 | | 12/2007 | McAden |
| 7,932,815 B2 | | 4/2011 | Martinez et al. |
| 8,223,009 B2 | | 7/2012 | Anderson et al. |
| 9,409,510 B1 | | 8/2016 | Feagan |
| 9,716,968 B2 | | 7/2017 | Mansuri et al. |
| 2008/0143593 A1 | | 6/2008 | Graziano et al. |
| 2011/0281522 A1 | | 11/2011 | Suda |
| 2013/0147617 A1 | * | 6/2013 | Boling ................... G08B 21/18 340/431 |
| 2013/0148748 A1 | | 6/2013 | Suda |
| 2017/0284817 A1 | * | 10/2017 | Greenspan ......... G01C 21/3438 |

* cited by examiner

*Primary Examiner* — Genna M Mott

(74) *Attorney, Agent, or Firm* — Nicholson De Vos Webster & Elliott LLP

(57) ABSTRACT

A method and a management server for automatically deducing a trailer is physically coupled with a vehicle are described. First location data including locations for the vehicle is received, from a first gateway device located on the vehicle. Second location data are received from second gateway devices, where each one of the second gateway devices is on a respective trailer from a set of trailers and each second location data includes locations for the respective trailer. For each trailer that meet a set of criteria, a score is calculated based at least in part on the first location data and the second location data of the trailer, where the score estimates a measure of association of the trailer with the vehicle. A first trailer is selected, based on the scores of the trailers, to be associated with the vehicle indicating that the first trailer is physically coupled with the vehicle.

28 Claims, 14 Drawing Sheets

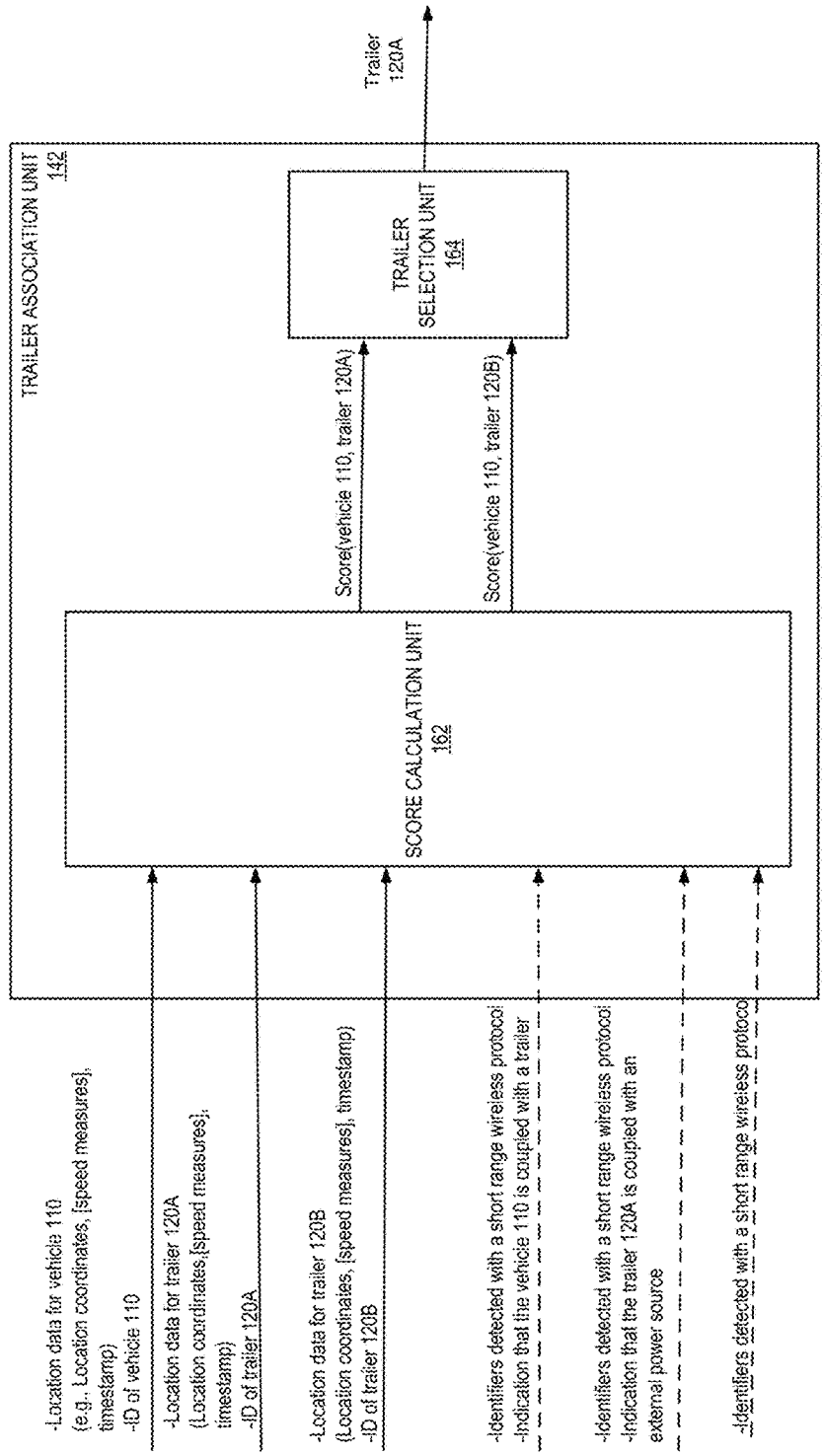

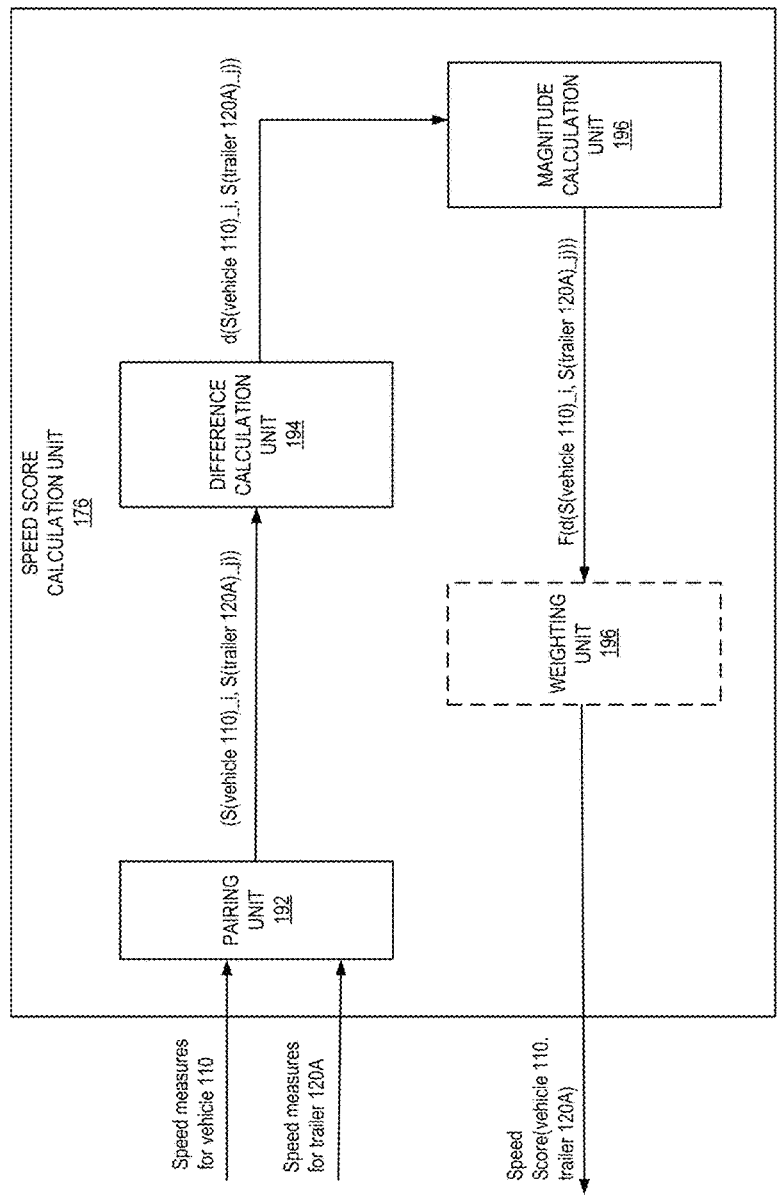

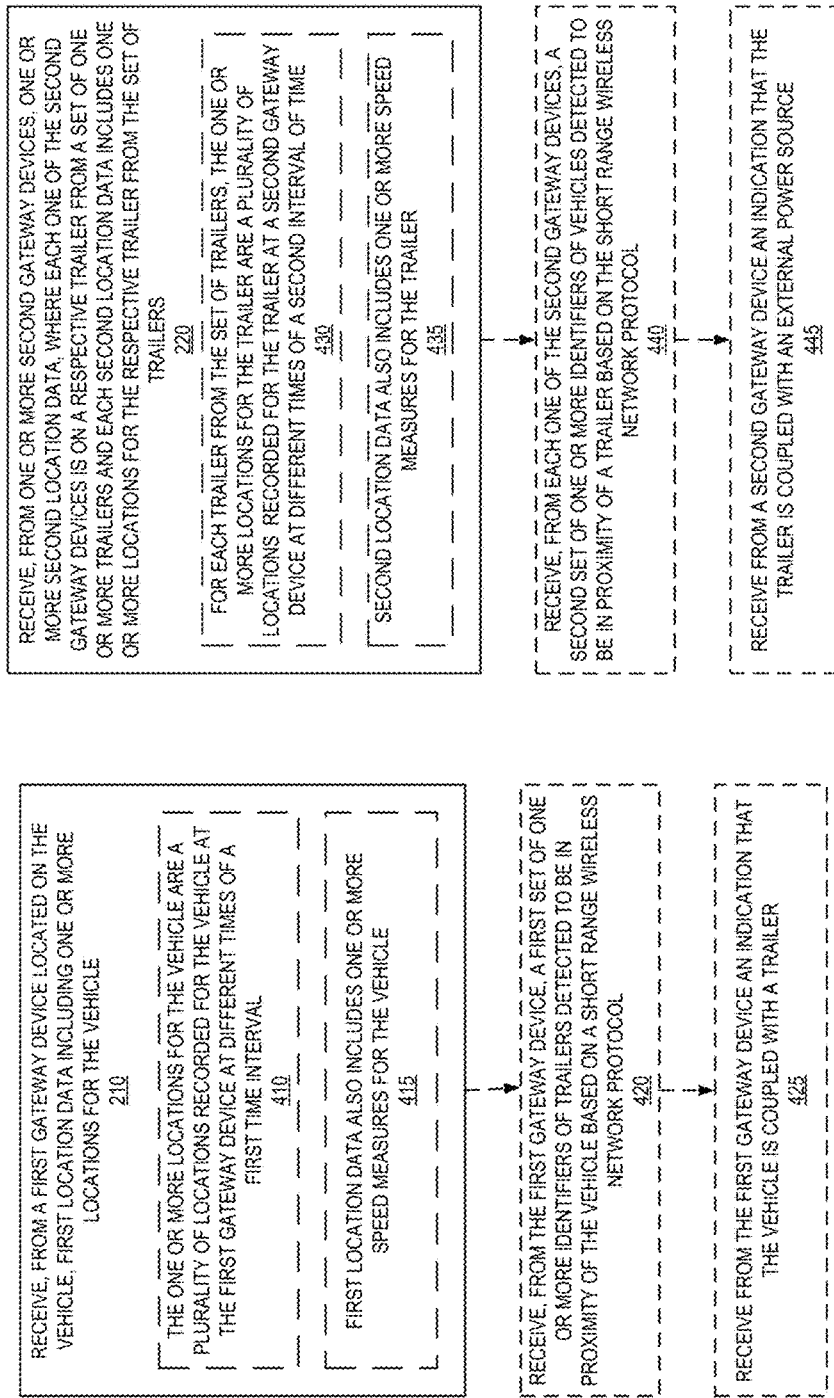

```
┌─────────────────────────────────────────────────────────────────────────┐
│ CALCULATE, FOR EACH TRAILER FROM THE SET OF TRAILERS, A SCORE BASED AT  │
│ LEAST IN PART ON THE FIRST LOCATION DATA AND A SECOND LOCATION DATA OF  │
│ THE TRAILER, WHERE THE SCORE ESTIMATES A MEASURE OF ASSOCIATION OF THE  │
│ TRAILER WITH THE VEHICLE                                                │
│                                   230                                    │
│  ┌───────────────────────────────────────────────────────────────────┐  │
│  │ FOR EACH TRAILER, DETERMINE A DISTANCE BETWEEN ONE OF THE         │  │
│  │ PLURALITY OF LOCATIONS FOR THE VEHICLE AND ONE OF THE PLURALITY   │  │
│  │ OF LOCATIONS FOR THE TRAILER, WHERE THE ONE OF THE PLURALITY OF   │  │
│  │ LOCATIONS FOR THE VEHICLE WAS RECORDED WITHIN A THRESHOLD         │  │
│  │ AMOUNT OF TIME OF WHEN THE ONE OF THE PLURALITY OF LOCATIONS      │  │
│  │ FOR THE TRAILER WAS RECORDED                                      │  │
│  │                              510                                   │  │
│  └──────────────────────────────────┬────────────────────────────────┘  │
│                                     ▼                                    │
│  ┌───────────────────────────────────────────────────────────────────┐  │
│  │ CALCULATE, FOR EACH TRAILER, THE SCORE BASED ON THE PLURALITY OF  │  │
│  │                      DISTANCES DETERMINED                          │  │
│  │                              515                                   │  │
│  └───────────────────────────────────────────────────────────────────┘  │
└─────────────────────────────────────┬───────────────────────────────────┘
                                      ▼
┌─────────────────────────────────────────────────────────────────────────┐
│ SELECT, BASED ON THE SCORES OF THE TRAILERS, A FIRST TRAILER FROM THE   │
│ SET OF TRAILERS TO BE ASSOCIATED WITH THE VEHICLE INDICATING THAT THE   │
│ FIRST TRAILER IS PHYSICALLY COUPLED WITH THE VEHICLE                    │
│                                   250                                    │
│  ┌───────────────────────────────────────────────────────────────────┐  │
│  │ THE SCORE OF THE FIRST TRAILER INDICATES THAT EACH ONE OF THE     │  │
│  │ DISTANCES CALCULATED FOR THE FIRST TRAILER ARE WITHIN A           │  │
│  │ PREDETERMINED THRESHOLD                                            │  │
│  │                              520                                   │  │
│  └───────────────────────────────────────────────────────────────────┘  │
└─────────────────────────────────────────────────────────────────────────┘
```

Fig. 5

METHOD AND APPARATUS FOR AUTOMATICALLY DEDUCING A TRAILER IS PHYSICALLY COUPLED WITH A VEHICLE

FIELD

Embodiments of the invention relate to the field of fleet management, and more specifically, to the association of automatically deducing a trailer is physically coupled with a vehicle having a trailer hitch.

BACKGROUND

Vehicle tracking and trailer tracking are an important part of fleet management. The complex and large-scale operations of fleet management systems dictate that the owners/administrators keep track of the status and location of the vehicles and the trailers. Trailers of a fleet can be parked in trailer yards or distribution centers prior to being picked up and used for goods delivery. A "hook" event occurs, when a driver physically couples a vehicle to a trailer for transporting goods or material from a location to another location.

Typically a driver of a vehicle (e.g., of a tractor) will physically couple its vehicle with the trailer that he is to transport. An administrator/owner of the trailer or the vehicle may want to learn at the moment that the "hook" event occurs an identification of the trailer that is to be picked up by a given vehicle. This information can be used by the owner/administrator to determine whether the right trailer has been coupled to the proper vehicle, that a delivery event is initiated, etc.

Several techniques exist for virtually associating a trailer with a respective vehicle to indicate that the vehicle and the trailer are physically coupled. Some solutions use separate proprietary systems for tracking trailers and vehicles. The use of the separate proprietary systems renders the task of associating a trailer with a corresponding vehicle very complex for an administrator of the fleet. Other solutions rely on static association between trailer and vehicle made by an operator or the driver of the vehicle, requiring that the person be present at the site where the hook event occurs.

Some existing solutions may rely only on localized information exchanged between a vehicle and a trailer via short range network communication protocols. However, typically the hook event occurs in locations where hundreds or thousands of trailers and vehicles can be parked, which makes this solution prone to errors and inaccuracies due to the multiple trailers or vehicles that can be detected by a vehicle or trailer via a short range network communication protocol.

SUMMARY

One general aspect includes a method, in a management server device located in the cloud, of automatically deducing a trailer is physically coupled with a vehicle having a trailer hitch, the method including: receiving, from a first gateway device located on the vehicle, first location data including one or more locations for the vehicle; receiving, from one or more second gateway devices, one or more second location data, where each one of the second gateway devices is on a respective trailer from a set of one or more trailers and each second location data includes one or more locations for the respective trailer from the set of trailers; calculating, for each trailer from the set of trailers that meet a set of criteria, a score based at least in part on the first location data and the second location data of the trailer, where the score estimates a measure of association of the trailer with the vehicle; and selecting, based on the scores of the trailers, a first trailer from the set of trailers to be associated with the vehicle indicating that the first trailer is physically coupled with the vehicle.

One general aspect includes a management server device located in the cloud for automatically deducing a trailer is physically coupled with a vehicle having a trailer hitch, the management server device including: a non-transitory computer readable storage medium to store instructions; and a processor coupled with the non-transitory computer readable storage medium to process the stored instructions to: receive, from a first gateway device located on the vehicle, first location data including one or more locations for the vehicle; receive, from one or more second gateway devices, one or more second location data, where each one of the second gateway devices is on a respective trailer from a set of one or more trailers and each second location data includes one or more locations for the respective trailer from the set of trailers; calculate, for each trailer from the set of trailers that meet a set of criteria, a score based at least in part on the first location data and the second location data of the trailer, where the score estimates a measure of association of the trailer with the vehicle. The management server device also includes select, based on the scores of the trailers, a first trailer from the set of trailers to be associated with the vehicle indicating that the first trailer is physically coupled with the vehicle.

One general aspect includes a non-transitory computer readable storage medium that provide instructions, which when executed by a processor of a management server device located in the cloud, cause said processor to perform operations including: receiving, from a first gateway device located on a vehicle, first location data including one or more locations for the vehicle; receiving, from one or more second gateway devices, one or more second location data, where each one of the second gateway devices is on a respective trailer from a set of one or more trailers and each second location data includes one or more locations for the respective trailer from the set of trailers; calculating, for each trailer from the set of trailers that meet a set of criteria, a score based at least in part on the first location data and the second location data of the trailer, where the score estimates a measure of association of the trailer with the vehicle; and selecting, based on the scores of the trailers, a first trailer from the set of trailers to be associated with the vehicle indicating that the first trailer is physically coupled with the vehicle.

BRIEF DESCRIPTION OF THE DRAWINGS

The invention may best be understood by referring to the following description and accompanying drawings that are used to illustrate embodiments of the invention. In the drawings:

FIG. 2A illustrates a block diagram of an exemplary trailer association unit for enabling automatic deduction that a trailer is physically coupled with a vehicle having a trailer hitch in accordance with some embodiments.

FIG. 2D illustrates a block diagram of an exemplary speed score calculation unit, in accordance with some embodiments.

FIG. 4A illustrates a flow diagram of exemplary operations for receiving data from a gateway device located on the vehicle, in accordance with some embodiments.

FIG. 4B illustrates a flow diagram of exemplary operations for receiving data from a gateway device located on the trailer, in accordance with some embodiments.

FIG. 5 illustrates a flow diagram of exemplary operations for calculating scores for one or more trailers and selecting a trailer based on the scores in accordance with some embodiments.

DESCRIPTION OF EMBODIMENTS

Figure 1A:
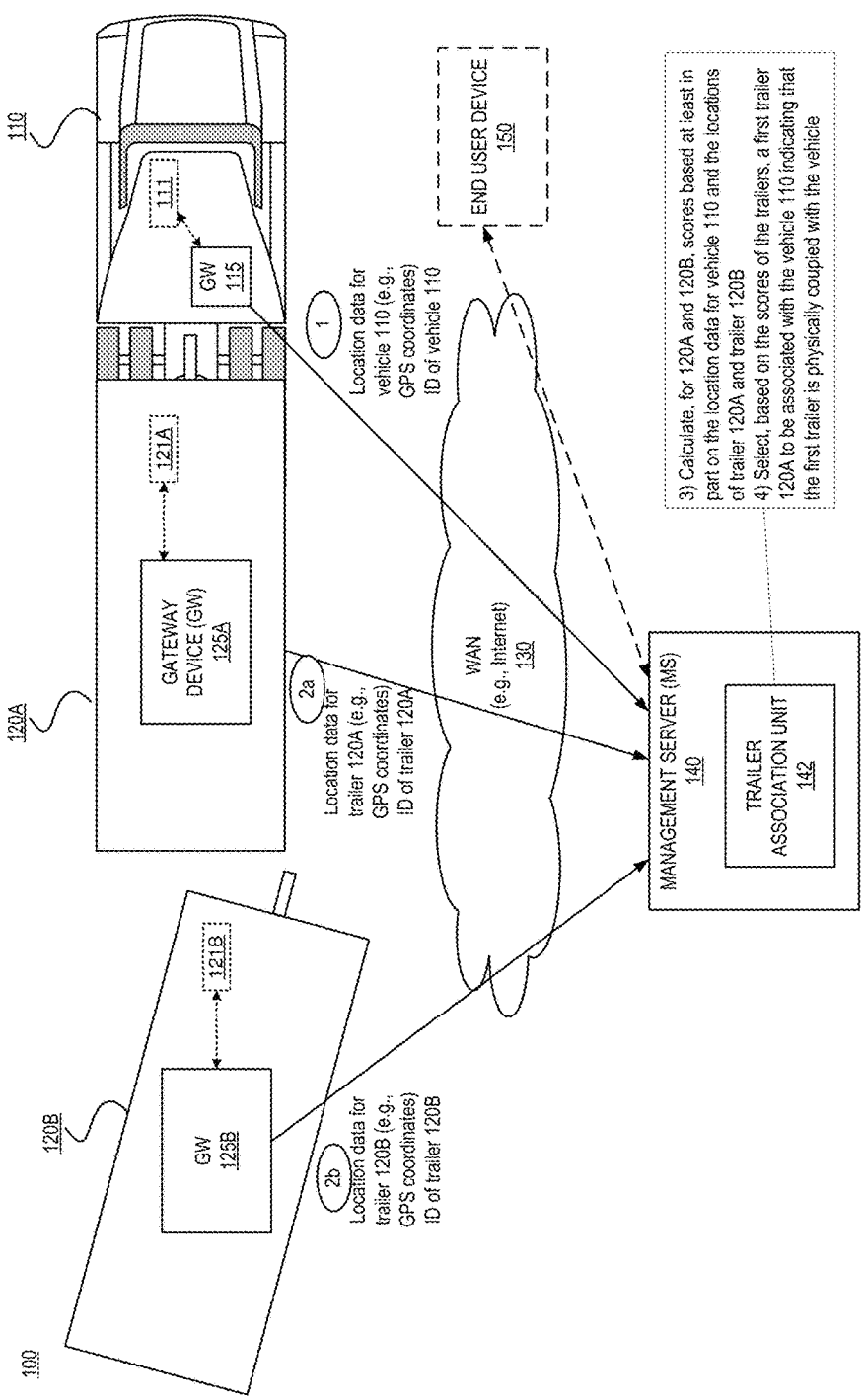
FIG. 1A illustrates a block diagram of an exemplary fleet management network for enabling automatic deduction that a trailer is physically coupled with a vehicle having a trailer hitch in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Association of Trailer and Vehicle:

Systems and methods of automatically deducing a trailer is physically coupled with a vehicle having a trailer hitch are described. According to some embodiments, the system and method provide mechanisms for accurate and fast automatic determination/deduction that a trailer and a vehicle are physically coupled. In the description below, the deduction that a trailer and a vehicle are physically coupled can be referred to an association between the trailer and the vehicle. In some embodiments, the association of a vehicle with a trailer can be used to determine whether the trailer is coupled to the proper vehicle when a vehicle is used to transport the trailer to a predetermined location. In some embodiments, the association of a vehicle with a trailer that the trailer is coupled to a vehicle is used to verify that the trailer was dropped at the right location following a delivery. In some embodiments, the association of a vehicle with a trailer can be used to determine whether a trailer is being pulled by an authorized or an unauthorized vehicle. As will be described below several uses and advantages result from the automatic determination/deduction that a trailer is physically coupled with a given vehicle.

According to some embodiments, a method and a management server device located in the cloud, for automatically deducing a trailer is physically coupled with a vehicle having a trailer hitch are described. The management server receives, from a first gateway device located on the vehicle, first location data including one or more locations for the vehicle. The management server also receives, from one or more second gateway devices, one or more second location data, where each one of the second gateway devices is on a respective trailer from a set of trailers and each second location data includes one or more locations for the respective trailer from the set of trailers. The management server calculates, for each trailer from the set of trailers that meet a set of criteria, a score based at least in part on the first location data and the second location data of the trailer, where the score estimates a measure of association of the trailer with the vehicle; and selects, based on the scores of the trailers, a first trailer from the set of trailers to be associated with the vehicle indicating that the first trailer is physically coupled with the vehicle.

FIG. 1A illustrates a block diagram of an exemplary fleet management network for enabling automatic deduction that a trailer is physically coupled with a vehicle having a trailer hitch in accordance with some embodiments. The fleet management network 100 includes a vehicle 110, a first trailer 120A, a second trailer 120B, and a management server 140. The vehicle 110 can be any type of vehicle that has a trailer hitch and is operative to be physically coupled to a trailer. For example, the vehicle 110 can be a tractor, a tow truck, a semi-truck, or any other type of vehicle that is operative to be coupled with and pull a trailer. The trailer can be an unpowered vehicle towed by a powered vehicle. The trailer can be used for the transport of goods and materials. The trailer can also be a recreational vehicle, travel trailer, or a mobile that can be coupled with a powered vehicle. While the embodiments herein will be described with a vehicle and a trailer, one of ordinary in the art would understand that the techniques herein apply to any types of vehicles that are operative to be coupled to one another.

The vehicle 110 and the trailers 120A-B are part of a fleet of vehicles operated by a fleet manager and are typically located remotely from the management server 140. The vehicle 110 and the trailers 120A-B are located within a given proximity of one another, for example within a geographic perimeter. For example, the vehicle 110 and the trailers 120A-B can be located in a trailer yard, a delivery location set up by a customer, a warehouse facility, etc. In a typical non-limiting example, the geographic perimeter would include several trailers and/or vehicles at a given time. While the illustrated examples herein show only two trailers and a single vehicle this is intended to be exemplary only and not a limiting aspect of this invention. Any number of vehicles and/or trailers can be located at a given location without departing from the scope of the present invention. In some examples, tens, hundreds, or thousands or vehicles and trailer can be located within the geographic perimeter at any given time.

Each of the vehicle 110, the trailer 120A, and the trailer 120B include a gateway device (GW). The gateway device 115 is located on the vehicle 110. The gateway device 125A is located on the trailer 120A and the gateway device 125B is located on the trailer 120B. The management server 140 is also coupled with the gateway devices 115, 120A-B, and with an end user device 150 through a Wide Area Network (WAN) 130.

Each one of the gateway devices 115, 125A, and 125B are electronic devices. The gateway device 115 can connect to the vehicle's electronic device. For example, the gateway device 115 can be coupled to an On-board diagnostics (OBD) port of the vehicle. Each one of the gateway devices 115, 125A, and 125A connects to the management server 140 through the WAN 130. The connection to the WAN is a wireless connection (e.g., WiFi, cellular connection, etc.). In some embodiments, the management server 140 may be subject to an intermittent connectivity with the WAN. Each one of the gateway devices 115, 125A, and 125B is operative to record data related to the vehicle on which they are mounted and transmit the data to the management server 140. In some embodiments, the data may be location data such as a location/position of the vehicle at a given time, or the speed the vehicle at a given time. In some embodiments, other and/or additional data can be recorded such that information on whether the trailer is powered or not by an external power source, information on whether the vehicle is coupled with a trailer, etc. In some embodiments the gateway devices 115, 125A, 125B are implemented as described in further details with reference to FIG. 10. Each one of the gateway devices 115, 125A, and 125B is operative to communicate with one or more other gateway devices via a short range network communication protocol.

The management server 140 is a cloud based server operative to receive data from one or more gateway devices (e.g., the gateway device 115, 125A, and 125B). The data received from the gateway devices are used by the trailer association unit 142 to automatically deduce/determine that a trailer is physically coupled with a vehicle. This determination is automatic and does not require the intervention of an observer (e.g., a driver of the vehicle, a manager of the site at which the vehicle and trailer are located, etc.) that is physically present at the time the vehicle and trailer are physically coupled. In some embodiments the management server 140 is implemented as described in further details with reference to FIG. 9.

The fleet management network 100 further includes an end user device 150 that is a computing device (e.g., laptop, workstation, smartphone, palm top, mobile phone, tablet, etc.) capable of accessing network resources (e.g., it includes software such as web browsers or web applications that are capable of accessing network resources (e.g., HTTP client, FTP client, SSH client, Telnet client, etc.)). A user of the end user device 150 connects to the management server 140 to access data about the vehicles and/or trailers of a fleet of vehicles/trailers. In some embodiments, the user of the end user device 150 accesses a fleet management service that is provided through the management server 140 to monitor the vehicles and trailers. The user of the end user device 150 can be the owner of the vehicles and trailers, and the gateway devices 115, 125A, and 125B, while in other embodiments, the user is an administrator of the vehicles and the devices.

In some embodiments, the vehicle 110 may also include one or more wireless sensing devices (WSD), e.g., WSD 111. The trailer 120A and the trailer 120B may also include one or more WSDs (e.g., optional WSD 121A may be located on the trailer 120A, and optional WSD 121B may be located on the trailer 120B). Each of the wireless sensing devices 111, 121A, 121B is an electronic device that includes one or more sensors for detecting physical events (e.g., temperature, humidity, barometric pressure, $CO_2$ concentration, acceleration, pressure, sound, movement, etc.) and recording sensor measurements in response to the detection of these physical events. The wireless sensing device can be a small electronic device that is attachable to an object for recording sensor information related to physical events related to the object (e.g., recording changes in temperature, movement of an object (e.g., a door being closed/opened), sudden accelerations of a vehicle, etc.). Each of the WSD 111, 121A, and 121B can then store the sensor measurements related to physical events detected over a period of time. The WSDs 111, 121A, and 121B may record sensor measurements at regular intervals of time (e.g., they may detect the temperature of a room, or an object (e.g., refrigerator, food product), and record corresponding temperature measurements every N seconds or minutes). The sensor measurements are stored in a non-transitory computer readable medium of the WSD. The WSDs are operative to be coupled to one or more gateway devices (e.g., gateway device 115, 125A-B) and establish a communication channel to transfer the recorded sensor measurements to the management server 140. In some embodiments, the WSDs can connect to the gateway device through a short range wireless communication interface (e.g., Bluetooth LE). Thus, the WSDs are operative to detect a gateway device and negotiate a connection to the gateway.

The management server 140 is operative to receive data from the gateway devices 115, 125A, and 125B and to automatically determine that the vehicle 110 is physically coupled with the trailer 120A. At operation 1, the gateway device 115 transmits location data for vehicle 110 to the management server 140. At operation 2a, the gateway device 125A transmits location data for the trailer 120A to the management server 140. At operation 2b, the gateway device 125B transmits location data for the trailer 120B to the management server 140. In some embodiments, the location data is an indication of the position of the vehicle or trailer at a given time as recorded by the respective gateway device. For example, the location data can include Global Positioning System (GPS) coordinates (latitude and longitude) detected by the gateway device. In some embodiments, the gateway device (e.g., 115, 125A, or 125B) records a location of the vehicle/trailer on which it is mounted at different times over an interval of time. For example, the gateway device may record the location of the vehicle/trailer at a regular interval every n seconds (e.g., n=0.5 second, n=1 second, n=2 seconds, etc.). The gateway device may record the location and an associated timestamp indicating the time at which the location is recorded. In some embodiments, the set of locations is transmitted to the management server 140 with associated timestamps and an identifier of the vehicle/trailer uniquely identifying the vehicle/trailer. In some embodiments, the identifier of the vehicle/trailer may have been set up for the vehicle/trailer at the time the gateway device was installed on the vehicle/trailer and registered as part of a fleet of vehicles/trailers at the management server 140.

At operation 3, upon receipt of the location data from the vehicle 110, the trailer 120A, and the trailer 120B, the trailer association unit 142 of the management server 140 calculates for each trailer a score based at least in part of the location data received from the vehicle 110, the trailer 120A, and the trailer 120B. At operation 4, the trailer association unit 142 selects based on the scores determined for the trailers, that the first trailer 120A is to be associated with the vehicle 110 indicating that the first trailer 120A is physically coupled with the vehicle.

In the embodiments described above, the score determined for each trailer and vehicle couple is based on one or more locations recorded for each one of the vehicle and the trailer. As will be described in further details below with reference to FIG. 2A-D, the score is an indication of how compatible the location of the trailer is with respect to the location of the vehicle and estimates a likelihood that the trailer is physically coupled with the vehicle. In some embodiments, the score is an indication of how compatible several locations of the trailer are with several locations of the vehicle over a given interval of time (as reflected by the use of multiple locations recorded for different times within the given interval of time in the calculation of the score). In the present embodiments, a high score (i.e., a score that is greater than a predetermined threshold) is indicative of the trailer and the vehicle being physically coupled.

Figure 1B:
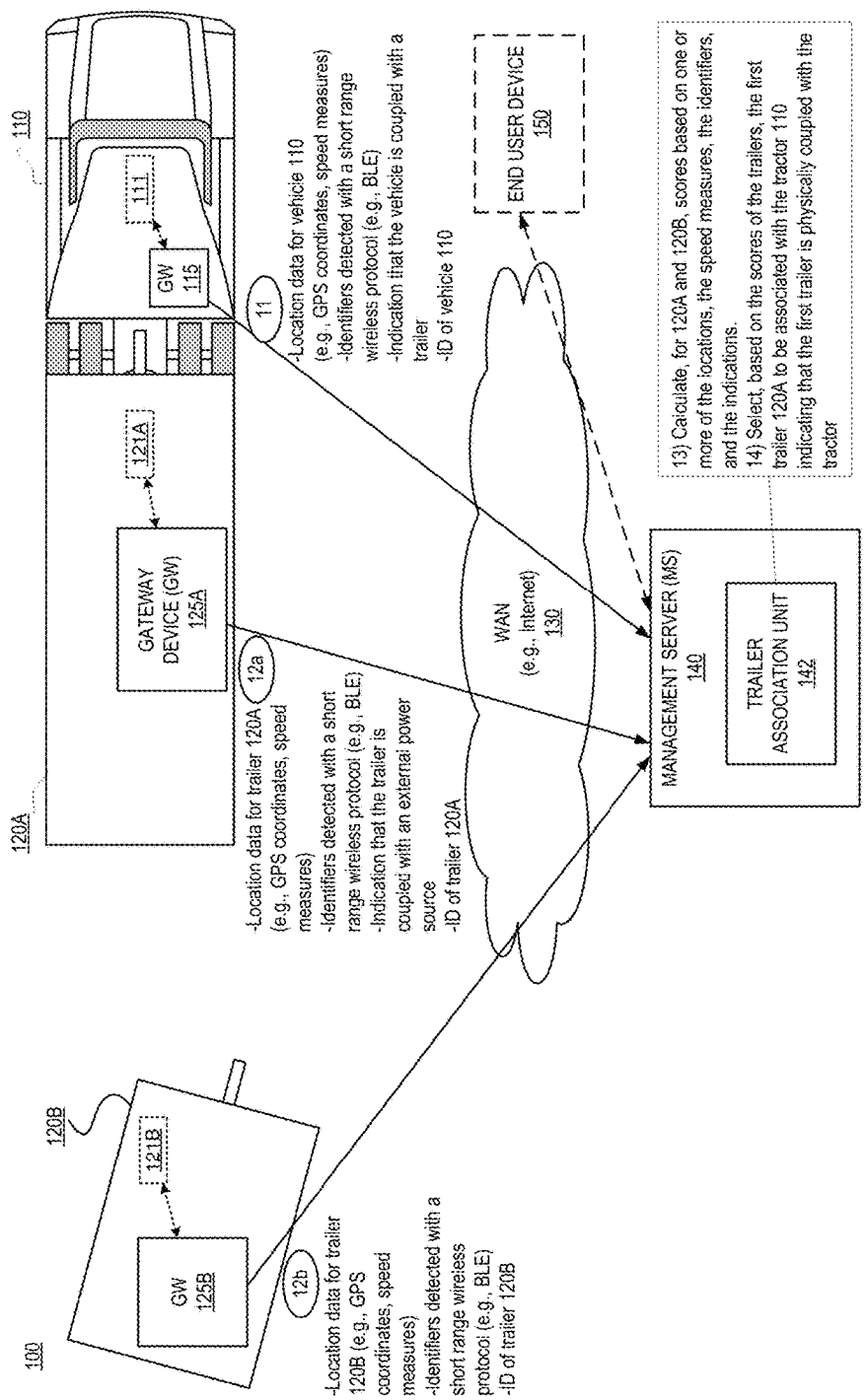
FIG. 1B illustrates a block diagram of an exemplary fleet management network enabling automatic deduction that a trailer is physically coupled with a vehicle having a trailer hitch in accordance with some embodiments.

In some embodiments, additional types of data can be received by the management server 140 from each one of the gateway devices 115, 125A, and 125B and used to calculate the score for each trailer for a given vehicle. FIG. 1B illustrates a block diagram of an exemplary fleet management network enabling automatic deduction that a trailer is physically coupled with a vehicle having a trailer hitch, in accordance with some embodiments. At operation 11, the gateway device 115 of the vehicle 110 transmits location data for the vehicle 110, one or more identifiers of trailers detected with a short range wireless protocol, and/or an indication that the vehicle is coupled with a trailer. The location data for the vehicle may include GPS coordinates and speed measures for the vehicle 110. In some embodiments, these GPS coordinates and speed measures may be recorded over a period of time at a regular interval. The gateway device may transmit each GPS coordinates and speed measure with an associated timestamp indicating the time at which the coordinates and the speed measures are recorded. In some embodiments, the set of location data (including the GPS coordinates and the speed measures) is transmitted to the management server 140 with associated timestamps and an identifier of the vehicle 110 uniquely identifying the vehicle 110.

The gateway device 115 of the vehicle 110 may also transmit identifiers of trailers detected with a short range wireless protocol. The set of identifiers of the trailers are transmitted along with a timestamp indicating a time at which the identifiers are detected by the gateway device 115 and the identifier of the vehicle 110. The short range wireless protocol can be any protocol that enables the gateway device 115 to communicate with other gateway devices (or other electronic devices enabled to implement a short range network protocol) within a relatively short distance from the gateway device. In some embodiments, the gateway device 115 detects through the short range wireless protocol a set of trailers and vehicles that include gateway devices (e.g., trailer 120A and trailer 120B). In some embodiments, the gateway device 115 only transmits to the management server 140 identifiers that identify trailers and ignores any identifiers of vehicles. In other embodiments, the gateway device 115 transmits all identifiers, including both identifiers of trailers and vehicles that are detected via the short range wireless protocol. In these embodiments, the management server 140 may ignore the identifiers of the vehicles received from the gateway device 115 and only use the identifiers of trailers received from the gateway device 115. In other embodiments, the management server 140 may use all identifiers that are received in the calculation of scores.

The gateway device 115 of the vehicle 110 may also transmit an indication that the vehicle 110 is coupled with a trailer along with a timestamp and an identifier of the vehicle 110. In some embodiments, the indication is a Boolean parameter that is transmitted from the gateway device 115 to the management server 140 that indicates whether the vehicle is coupled or not to a trailer at a given time that is indicated by the timestamp. For example, the gateway device 115 may determine through a connection to the diagnostic port of the vehicle that the vehicle is connected to a trailer. While this information may provide an indication as to whether the vehicle is physically coupled with a trailer, the information does not indicate an identity of the trailer that is connected.

At operation 12a, the gateway device 125A of the trailer 120A transmits location data for the trailer 120A, a set of one or more identifiers of vehicles detected with a short range wireless protocol, and/or an indication that the vehicle is coupled with a trailer. The location data for the vehicle may include GPS coordinates and speed measures for the trailer 120A. In some embodiments, these GPS coordinates and speed measures may be recorded over a period of time at a regular interval. The gateway device 125A may transmit each GPS coordinates and speed measure with an associated timestamp indicating the time at which the coordinates and the speed measures are recorded. In some embodiments, the set of location data (including the GPS coordinates and the speed measures) is transmitted to the management server 140 with associated timestamps and an identifier of the trailer uniquely identifying the trailer.

The gateway device 125A of the trailer 120A may also transmit identifiers of vehicles detected with a short range wireless protocol. The set of identifiers of the trailers are transmitted along with a timestamp indicating a time at which the identifiers are detected by the gateway device 125A and the identifier of the trailer 120A. The short range wireless protocol can be any protocol that enables the gateway device 125A to communicate with other gateway devices (or other electronic devices enabled to implement a short range network protocol) within a relatively short distance from the gateway device. In some embodiments, the gateway device 125A detects through the short range wireless protocol a set of trailers and vehicles that include gateway devices (e.g., vehicle 110 and trailer 120B). In some embodiments, the gateway device 125A only transmits to the management server 140 identifiers that identify vehicles and ignores any identifiers of trailers. In other embodiments, the gateway device 125A transmits all identifiers, including both identifiers of trailers and vehicles that are detected via the short range wireless protocol. In these embodiments, the management server 140 may ignore the identifiers of the trailers received from the gateway device 125A and only use the identifiers of vehicles received from the gateway device 125A. In other embodiments, the management server 140 may use all identifiers that are received in the calculation of scores.

The gateway device 125A of the trailer 120A may also transmit an indication that the trailer 120A is powered by an external power source. In some embodiments, when the trailer is physically coupled with a vehicle, the gateway device 125A is powered by a battery of the vehicle. In these embodiments, the gateway device 125A may detect that the power source is external and therefore may set a Boolean parameter to indicate the coupling. This parameter is transmitted to the management server 140 with a timestamp indicating the time at which the coupling of the trailer with the external power source is detected.

At operation 12b, the gateway device 125B of the trailer 120B transmits location data for the trailer 120B, one or more identifiers of vehicles detected with a short range wireless protocol, and/or an indication that the vehicle is coupled with a trailer. The location data for the vehicle may include GPS coordinates and speed measures for the trailer 120B. In some embodiments, these GPS coordinates and speed measures may be recorded over a period of time at a regular interval. The gateway device 125B may transmit each GPS coordinates and speed measure with an associated timestamp indicating the time at which the coordinates and the speed measures are recorded. In some embodiments, the set of location data (including the GPS coordinates and the speed measures) is transmitted to the management server 140 with associated timestamps and an identifier of the trailer uniquely identifying the trailer.

The gateway device 125B of the trailer 120B may also transmit identifiers of vehicles detected with a short range wireless protocol. The set of identifiers of the trailers are transmitted along with a timestamp indicating a time at which the identifiers are detected by the gateway device 125B and the identifier of the trailer 120B. The short range wireless protocol can be any protocol that enables the gateway device 125B to communicate with other gateway devices (or other electronic devices enabled to implement a short range network protocol) within a relatively short distance from the gateway device. In some embodiments, the gateway device 125B detects through the short range wireless protocol a set of trailers and vehicles that include gateway devices (e.g., vehicle 110 and trailer 120A). In some embodiments, the gateway device 125A only transmits to the management server 140 identifiers that identify vehicles and ignores any identifiers of trailers. In other embodiments, the gateway device 125B transmits all identifiers, including both identifiers of trailers and vehicles that are detected via the short range wireless protocol. In these embodiments, the management server 140 may ignore the identifiers of the trailers received from the gateway device 125B and only use the identifiers of vehicles received from the gateway device 125B. In other embodiments, the management server 140 may use all identifiers that are received in the calculation of scores.

In some embodiments, the gateway device 125B of the trailer 120B does not transmit an indication that the trailer 120B is powered by an external power source. In these embodiments, the management server 140 determines as a result of not receiving any indication that the trailer 120B is not coupled with an external power source. Alternatively, in some embodiments, the gateway device 125B may send an indication that it is not coupled with an external power source.

In some embodiments, Bluetooth, Bluetooth Low Energy (BLE), ZigBee, Radio Frequency Identification (RFID), Near-field communication (NFC), are non-limiting examples of protocols that can be used by the gateway device 115, 125A, or 125B to detect identifiers of other gateway devices, in particular gateway devices located on trailers.

In some embodiments, the location data, the identifiers and the indications are transmitted from each gateway device within a single message including corresponding timestamps and an identifier of the vehicle or trailer. In other embodiments, several messages may be used to transmit the various data related to the vehicle or the trailer.

At operation 13, the trailer association unit 142 of the management server 140 calculates for each trailer a score based at least in part on the location data, the identifiers, and the indications received from the vehicle 110, the trailer 120A, and the trailer 120B. At operation 14, the trailer association unit 142 selects based on the scores determined for the trailers, that the first trailer 120A is to be associated with the vehicle 110 indicating that the first trailer 120A is physically coupled with the vehicle.

While the embodiment of FIG. 1B describe several additional data transmitted from the gateway devices to the management server 140, in other embodiments only a subset of these data is sent or alternatively additional types of data and information can be transmitted without departing from the scope of the present invention.

In the embodiments described with reference to FIG. 1A, the score determined for each trailer and vehicle couple is based on locations recorded for each one of the vehicle and the trailer, and one or more additional parameters (e.g., speed measures, indication that the vehicle is coupled to a trailer, indication that the trailer is coupled with an external power source, the identifiers detected via the short range network protocol). The additional parameters, as will be described in further details below with reference to FIG. 2A-D, enable a refinement of the score for each trailer/vehicle couple and provide a more accurate estimation of likelihood that the trailer is physically coupled with the vehicle. In some embodiments, the score is an indication of how compatible several locations of the trailer are with several locations of the vehicle over a given interval of time, but also how compatible speed measures of the trailer are compatible with several speed measures of the vehicle. The score takes into account additional parameters (e.g., the identifiers and the indicators) that provide an enhanced estimation of the likelihood that the trailer and vehicle are coupled.

FIG. 2A illustrates a block diagram of an exemplary trailer association unit for enabling automatic deduction that a trailer is physically coupled with a vehicle having a trailer hitch in accordance with some embodiments. The trailer association unit 142 includes a score calculation unit 162 and a trailer selection unit 164. The score calculation unit 162 is operative to calculate, for each trailer (e.g., trailer 120A, 120B) from the set of trailers that meet a set of criteria, a score based at least in part on the first location data and the second location data of the trailer. The first location data may include location coordinates, e.g., received from the vehicle 110 at operation 1. In some embodiments, the first location data may also include speed measures recorded for the vehicle, e.g., received at operation 11 of FIG. 1B. The score (e.g., Score (vehicle 110, trailer 120A) or Score (vehicle 110, trailer 120B)) estimates a measure of association of the trailer (e.g., trailer 120A or trailer 120B) with the vehicle (e.g., vehicle 110).

In some embodiments, the score calculation unit 162 can also calculate the score based on additional parameters received from the trailers and/or the vehicle. For example, the score calculation unit 162 calculates the score also based on a first set of identifiers detected by the vehicle through a short range wireless protocol and second sets of identifiers detected by each one of the trailers 120A and 120B through the short range wireless protocol. In some embodiments, the score is further based on an indication of whether the trailer is coupled with an external power source (e.g., gateway device 125A transmits an indication that the trailer 120A is coupled with an external power source, gateway device 125B does not transmit an indication that the trailer 120B is coupled with an external power source). In some embodiments, the score is further determined based on the indication that the vehicle 110 is coupled with a trailer.

The scores (e.g., Score (vehicle 110, trailer 120A) or Score (vehicle 110, trailer 120B)) determined for each one of the trailers 120A and 120B are used by the trailer selection unit 164 to select a trailer (e.g., 120A) from the set of trailers to be associated with the vehicle indicating that the trailer (e.g., 120A) is physically coupled with the vehicle (e.g., 110). In some embodiments, the trailer selection unit 164 selects the trailer that has the highest score to be associated with the vehicle.

Figure 2B:
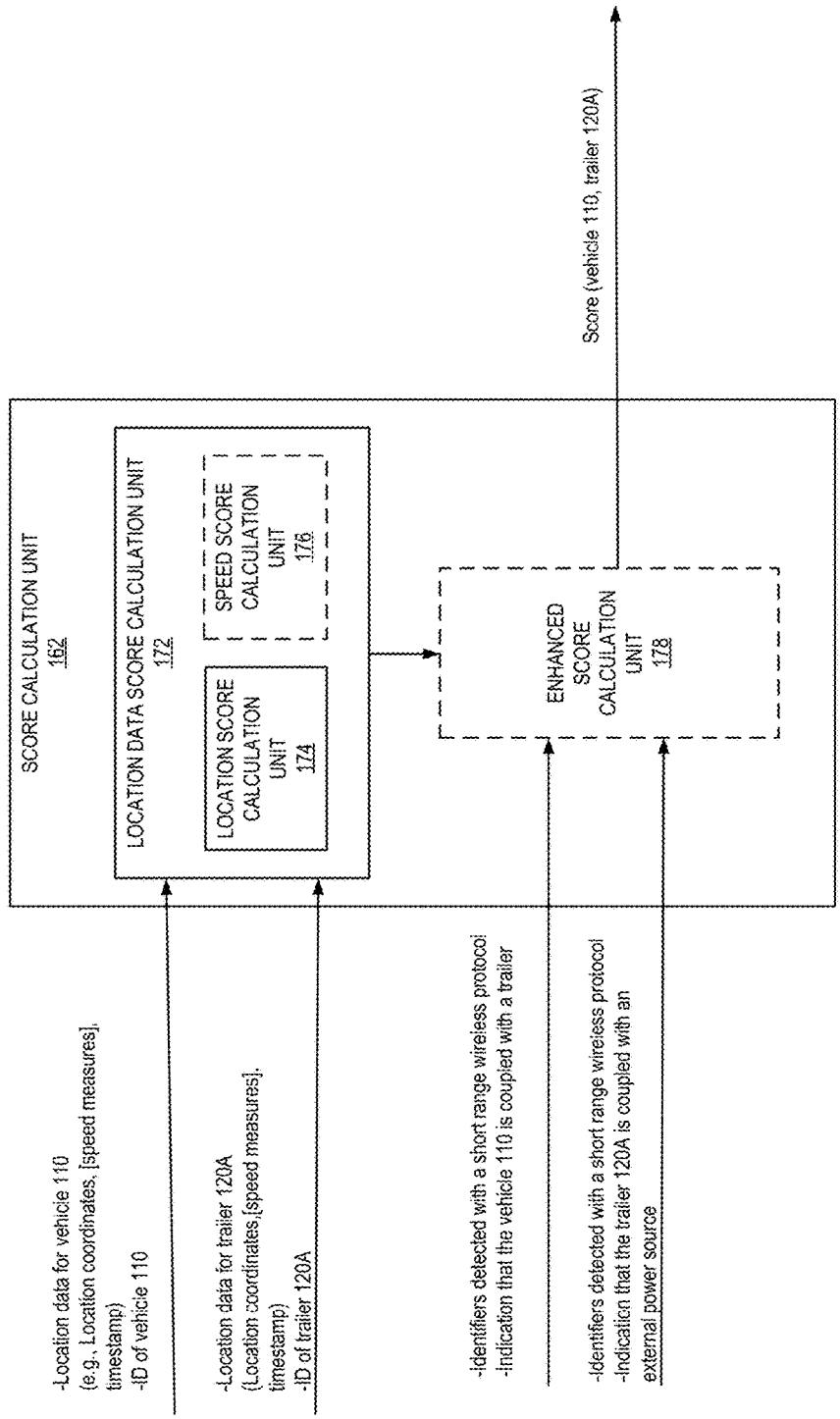
FIG. 2B illustrates a block diagram of an exemplary score calculation unit for calculating a score for a trailer and a vehicle couple based at least in part on location data for the trailer and the vehicle, in accordance with some embodiments.

FIG. 2B illustrates a block diagram of an exemplary score calculation unit for calculating a score for a trailer and a vehicle couple based at least in part on location data for the trailer and the vehicle, in accordance with some embodiments. The embodiments herein will be described with reference to vehicle 110 and trailer 120A, however one of ordinary skill in the art would understand that the same types of operations would be performed for any couple trailer/vehicle for which a score is to be determined. In the illustrated example of FIGS. 1A-B, a score is also calculated for the couple vehicle 110 and trailer 120B.

The score calculation unit 162 includes a location data score calculation unit 172, and an optional enhanced score calculation unit 178. The location data score calculation unit 172 determines for a trailer (e.g., trailer 120A) and a vehicle (e.g., vehicle 110) a score that estimates the measure of association of the trailer with the vehicle. The measure of association of a trailer with a vehicle is a measure of how likely is the trailer to be physically coupled with that particular vehicle. The location data score calculation unit 172 determines the score based on the location data of each one of the trailer and the vehicle. The location data score calculation unit 172 includes a location score calculation unit 174 and an optional speed score calculation unit 176. In some embodiments, only the location score calculation unit 174 is used to calculate the score, in other embodiments, a combination of the location score calculation unit 174 and the speed score calculation unit 176 are used to determine the score. In some embodiments, once the location data score is calculated at the location data score calculation unit 172, it is output as the total score for the couple (vehicle 110, trailer 120A). In other embodiments, the location data score can be used by an optional enhanced score calculation unit 178 to determine the score between the vehicle 110 and the trailer 120A. The enhanced score calculation unit 178 determines the score based on the location data, the identifiers detected with short range wireless protocol, an indication that the vehicle is coupled with a trailer, and an indication that the trailer is coupled with an external power source. In some embodiments, the enhanced score calculation unit 178 may use more or less parameters than the one described herein.

Figure 2C:
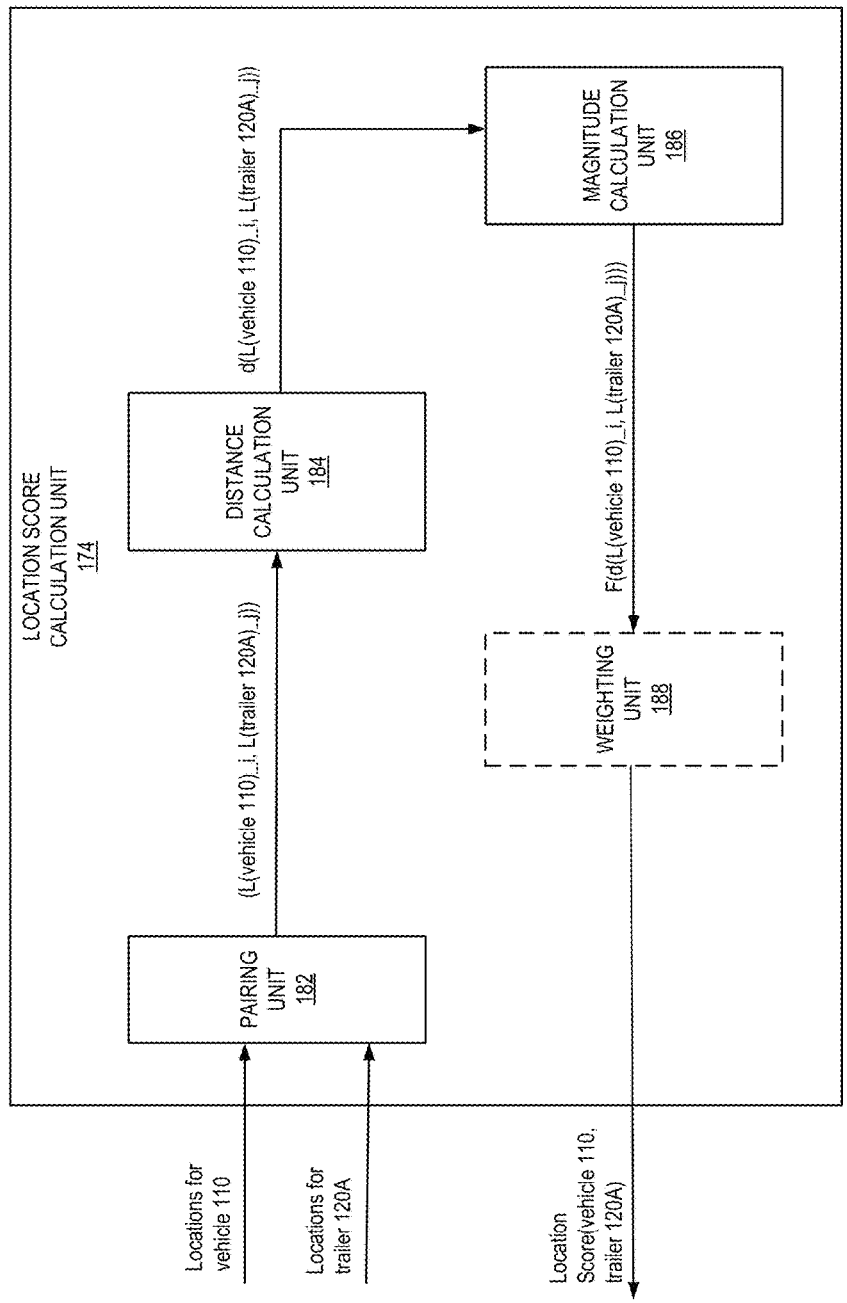
FIG. 2C illustrates a block diagram of an exemplary location score calculation unit, in accordance with some embodiments.

FIG. 2C illustrates a block diagram of a location score calculation unit, in accordance with some embodiments. The location score calculation unit 174 includes a pairing unit 182, a distance calculation unit 184, and an optional weighting unit 188. The location score calculation unit 174 receives one or more locations for the vehicle 110 (L(vehicle 110)), one or more locations for the trailer 120A (L(trailer 120A), and calculates a distance d(L(vehicle 110), L(trailer 120A)) for each couple L(vehicle 110), L(trailer 120A). The locations for the vehicle 110 may be GPS coordinates (latitude, longitude) associated with a timestamp indicating the time at which the location is recorded at the gateway device 115 and are associated with an identifier of the vehicle 110. The locations for the vehicle are multiple locations recorded for the vehicle by the first gateway device 115 at different times of a first time interval. The locations for the trailer 120A may be GPS coordinates (latitude, longitude) associated with a timestamp indicating the time at which the location is recorded at the gateway device 125A and are associated with an identifier of the vehicle 110. The locations for the trailer 120A are multiple locations recorded for the trailer 120A by the second gateway device 125A at different times of a second interval of time. The pairing unit 182 couples each location for the vehicle 110 with a respective location for the trailer 120A based on the timestamps of each location. The pair (L(vehicle 110)_i, L(trailer 120A)_j) is determined such that the first location L(vehicle 110)_i was recorded within a threshold amount of time of when the location L(trailer 120A)_j for the trailer 120A was recorded. The pairing is performed for all or a subset of the locations received for the vehicle 110 and for the trailer 120A and results in n pairs (L(vehicle 110)_i, L(trailer 120A)_j), where each pair is associated with a time t_k derived from the timestamps of location L(vehicle 110)_i and location L(trailer 120A)_j.

For each pair (L(vehicle 110)_i, L(trailer 120A)_j) at time t_k, the distance calculation unit 184 determines a distance between the two locations. The magnitude calculation unit 186 calculates for each distance d(L(vehicle 110)_i, L(trailer 120A)_j), a magnitude F(d) of the distance that decreases when the distance between two locations increases. For example, in some embodiments, the magnitude F(d) can be a function $F(d)=1/((1-d)^2)$. Other examples of magnitudes can be used without departing from the scope of the present invention. In some embodiments, the location score is determined based on the magnitudes of the n pairs of locations for the vehicle 110 and the trailer 120A. For example, the location score for the trailer 120A and the vehicle 110 can be a sum of the magnitudes for the n pairs F(d(L(vehicle 110)_i, L(trailer 120A)_j)). In other embodiments, each pair can be multiplied by an associated weight w(t_k) that is dependent on the time t_k associated with the pair (L(vehicle 110)_i, L(trailer 120A)_j). In these embodiments, the location score is a sum of the product of the weights with the magnitudes for a given time t_k, i.e., Location_score (vehicle 110, trailer 120A)=Σw(t_k)*F(d(t_k)) for k=1, . . . n. In some of these embodiments, the weights may be selected such that more recent locations are associated with greater weights. An exemplary weighting function can be w(t_k)=1/(2^t_k). Other examples of weighting functions can be used. The location score provides an indication on the proximity of the trailer and a high score indicates that a trailer is likely coupled with a vehicle. In some embodiments, the score of the first trailer 120A indicates that each one of the distances calculated for the first trailer are within a predetermined threshold. In other embodiments, the score of the first trailer 120A indicates that a substantial number of distances (e.g., a percentage such as 80%) calculated for the first trailer are within a predetermined threshold.

In some embodiments, the location score can be output by the score calculation unit 162 as the score between the vehicle 110 and the trailer 120A and used in combination with other location scores of the vehicle with other trailers (e.g., 120B) to determine the trailer that is physically coupled with the vehicle. In other embodiments, the score calculation unit 162 further determines the speed scores for the vehicle and the trailers and/or an enhanced score that is based on the location score, the speed score and additional parameters.

FIG. 2D illustrates a block diagram of a speed score calculation unit, in accordance with some embodiments. The speed score calculation unit 176 includes a pairing unit 192, a difference calculation unit 194, and an optional weighting unit 196. The speed score calculation unit 176 receives one or more speed measures for the vehicle 110 (S(vehicle 110)), one or more speed measures for the trailer 120A (S(trailer 120A), and calculates a distance d(S(vehicle 110), S(trailer 120A)) for each couple S(vehicle 110), S(trailer 120A). The speed measure for the vehicle 110 or for the trailer is an indication of the velocity of the vehicle or the trailer at a given time that is indicated with a timestamp. Each speed measure is received with its associated timestamp and an identifier of the vehicle and or trailer. The speed measures for the vehicle are multiple measures recorded for the vehicle by the first gateway device 115 at different times of a first time interval. The speed measures for the trailer 120A are multiple measures recorded for the trailer 120A by the second gateway device 125A at different times of a second interval of time. The pairing unit 192 couples each speed measure for the vehicle 110 with a respective speed measure for the trailer 120A based on the timestamps of each location. The pair (S(vehicle 110)_i, S(trailer 120A)_j) is determined such that the first speed measure S(vehicle 110)_i was recorded within a threshold amount of time of when the speed measure S(trailer 120A)_j for the trailer 120A was recorded. The pairing is performed for all or a subset of the speed measures received for the vehicle 110 and for the trailer 120A and results in n pairs (S(vehicle 110)_i, S(trailer 120A)_j), where each pair is associated with a time t_k derived from the timestamps of speed measure S(vehicle 110)_i and speed measure S(trailer 120A)_j.

For each pair (S(vehicle 110)_i, S(trailer 120A)_j), the difference calculation unit 194 determines a difference between the two speed measures. The magnitude calculation unit 196 calculates for each difference d(S(vehicle 110)_i, S(trailer 120A)_j), a magnitude F(d) of the difference that decreases when the difference between two speed measures increases. For example, in some embodiments, the magnitude F(d) can be a function F(d)=1/((1−d)^2). Other examples of magnitudes can be used without departing from the scope of the present invention. In some embodiments, the speed score is determined based on the magnitudes of the n pairs of locations for the vehicle 110 and the trailer 120A. For example, the speed score for the trailer 120A and the vehicle 110 can be a sum of the magnitudes for the n pairs F(d(S(vehicle 110)_i, S(trailer 120A)_j)). In other embodiments, each pair can be multiplied by an associated weight w(t_i) that is dependent on the time t_k associated with the pair (S(vehicle 110)_i, S(trailer 120A)_j). In these embodiments, the speed score is a sum of the product of the weight with the magnitude for a given time t_k, i.e., Speed_score (vehicle 110, trailer 120A)=Σw(t_k)*F(d(t_k)) for k=1, . . . n, d(t_k) being a difference between two speed measures d(S(vehicle 110)_i, S(trailer 120A)_i) at a time t_k In some of these embodiments, the weights may be selected such that more recent speed measures are associated with greater weights. An exemplary weighting function can be w(t_k)=1/(2^t_k). Other examples of weighting functions can be used. The speed score provides an indication of whether the trailer and the vehicle are moving at substantially the same speed and a high score indicates that a trailer is likely coupled with a vehicle. In some embodiments, the speed score of the first trailer 120A indicates that each one of the speed differences calculated for the first trailer are within a predetermined threshold. In other embodiments, the score of the first trailer 120A indicates that a substantial number (e.g., a percentage such as 80%) of speed distances calculated for the first trailer are within a predetermined threshold.

While the embodiments, were described with a speed score calculation unit 176 that is separate from the location score calculation unit 174, in other embodiments, the two units may be combined and the same components can be used with different inputs to pair locations or speed measures, determine a distance between locations or a difference between speed measures, calculate magnitudes and determine a score based on the weights in the weighting unit.

While in some embodiments, the location score or the speed score are calculated based on all the location data received from each one of the gateway device 115 of the vehicle 110 and the gateway device 125A of the trailer 120A, in other embodiments, a subset of the location data (e.g., a subset of the locations, or a subset of the speed measures) that is strictly less than the entire set of location data can be used in the calculation of the location score or the speed score. For example, in some embodiments, outlier locations or speed measures (e.g., for which the distance is greater than a predetermined location or speed threshold) can be discarded. This can, for example, account for errors that may occur in the systems that record the locations and/or the speed measures. In another example, to determine the subset of speed measures that are used in the calculation of the score, the speed score calculation unit 176 determines the time when the vehicle (and separately the trailer) change from having a zero speed measure to a non-zero speed measure, and the speed score is calculated for speed measures which satisfy that the time of zero to non-zero transition for the vehicle 110 and trailer 120A are within a predetermined threshold.

In some embodiments, the speed score and the location score can be combined to determine a total score: Score (vehicle 110, trailer 120A) for the vehicle 110 and the trailer 120A. For example, the total score can be a sum of the speed score and the location score. In other examples, the total score can be a weighted sum of the speed score and the location score.

In other embodiments, instead of outputting the location data score as the total score of for the trailer 120A and the vehicle 110, the score calculation unit 162 determines an enhanced score with the enhanced score calculation unit 178 using additional parameters that are received from the gateway device of the vehicle and the gateway device of the trailer. For example, the enhanced score calculation unit 178 can calculate the enhanced score based at least on one or more additional information such as the identifiers detected with the short range wireless protocol by the trailer or the vehicle, the indication that the vehicle 110 is coupled with a trailer, and the indication that the trailer 120A is coupled with an external power source.

In a non-limiting example, the Score (vehicle 110, trailer 120A) can be determined based on the following equation:

Score(vehicle 110, trailer 120A)=$w_1$(Trailer ID is in set of identifiers received from vehicle 110)+$w_2$ (Vehicle ID is in set of identifiers received from trailer 120A)+$w_3$ (trailer has external power source)+$w_4$ (vehicle is coupled with a trailer)+ $w_5$ SpeedScore(vehicle 110, trailer 120A)+ $w_6$LocationScore(vehicle 110, trailer 120A).

Where (trailer ID is in set of identifiers received from vehicle 110) is a Boolean parameter that indicates whether the trailer identifier was received at the management server 140 as part of the set of identifiers detected by the gateway device 115 of vehicle 110 through the short range network protocol;

(Vehicle ID is in set of identifiers received from trailer 120A) is a Boolean parameter that indicates whether the vehicle identifier was received at the management server 140 as part of the set of identifiers detected by the gateway device 125A of the trailer 120A through the short range network protocol;

(Trailer has external power source) is a Boolean parameter that indicates whether the trailer is coupled with an external power source;

(Vehicle is coupled with a trailer) is a Boolean parameter that indicates whether the vehicle is coupled with a trailer;

SpeedScore (vehicle 110, trailer 120A) is a score calculated at the speed score calculation unit 176 based on the speed measures for the vehicle 110 and the trailer 120A;

LocationScore (vehicle 110, trailer 120A) is a score calculated at the location score calculation unit 174 based on the locations for the vehicle 110 and the trailer 120A; and $w_1$, $w_2$, $w_3$, $w_4$, $w_5$ and $w_6$ are weights that are selected for each type of parameters. In some embodiments, the sum of the weights is 1.

In some embodiments, additional parameters can be used in the calculation of a score for a given vehicle and a trailer. For example, the wireless message signal strength of the short range network protocol can be used to refine the estimation of distance between a vehicle and trailer and the score for the vehicle/trailer couple.

While the embodiments above were described with a single vehicle 110, in some embodiments, the vehicle 110 is not the only vehicle within a determined geographical perimeter (e.g., a trailer yard, a warehouse location, a customer's location, etc.) and the management server 140 receives data from several gateway devices located on respective vehicles in that geographic perimeter. In these embodiments, the management server 140 may determine a score for each trailer/vehicle couple located in that geographical perimeter. The selection of the trailer for a given vehicle is determined from all the trailers associated with that vehicle. In some embodiments, instead of determining a score for all trailer/vehicle couples, the management server 140 may determine scores only for the vehicles or the trailers that are determined to be active. Several criteria may be used to determine that the vehicle or trailer is active. A vehicle may be determined to be active when it is determined to be in movement, when an indication that the vehicle is coupled with a trailer is received, when it is scheduled to pick up a trailer, etc. A trailer may be determined to be active when it is determined to be in movement, when an indication that the trailer is coupled with an external source is received, when it is scheduled to be picked-up a trailer, etc. In these embodiments, the management server 140 may determine for each vehicle that is active a score between the vehicle and trailers. Alternatively, the management server 140 may determine for each trailer that is active a score between the trailer and vehicles. In some embodiments, the management server 140 determines score only for couples of vehicle and trailers, where both the trailer and the vehicle is active.

While the embodiments, are described with a management server 140 receiving data from gateway devices that are located within a single geographical perimeter, in other embodiments, the management server 140 is operative to handle data received from several gateway devices located in different geographical perimeters remote from one another. For example, the management server 140 is operative to handle data received from a first trailer yard and from a second trailer yard that is located several kilometers or miles away from the first trailer yard. In these embodiments, the management server 140 is operative to determine scores for vehicle/trailer couples that are within a single geographical perimeter (e.g., located at a same yard).

In one embodiment, the management server 140 works for both single and multi-tenant installations, meaning that multiple organizations with different administrators may have gateway devices managed by the same management server. In these embodiments, vehicles of two organizations may be located within a same geographical perimeter (e.g., at a same trailer yard). In these embodiments, the management server 140 can filter the vehicles by organization prior to calculating the scores for couples of vehicles/trailers. In other embodiments, the management server 140 may calculate the score for vehicle/trailer across organizations, which may enable the system to alert an administrator of a given organization that a vehicle is coupled with a trailer of another organization.

While some embodiments have been described above with several parameters being factored in the calculation of the score for a trailer/vehicle couple (e.g., as described with ref. to FIGS. 2B-D), in other embodiments, the score can be determined only based on the locations and for trailers that satisfy a set of criteria. In other words, for each vehicle, the management server 140 can filter out a number of trailers for which a score is to be computed prior to calculating the score. In some embodiments, the criteria include a distance between at least one of the locations of the vehicle and at least one of the locations of the trailer is within a threshold proximity, an identifier of the vehicle is included in a set of identifiers detected by the second gateway device of the trailer via a short range wireless network protocol, an identifier of the trailer is included in a set of identifiers detected by the first gateway device of the vehicle via a short range wireless network protocol, and a speed measure of the trailer and a speed measure of the vehicle are non-zero, where the speed measure of the trailer was recorded within a threshold amount of time of when the speed measure of the vehicle was recorded.

In some embodiments, the mechanisms described with reference to FIGS. 1A-2D may be performed as part of a cloud-based fleet management service. In some embodiments, the mechanisms may be performed continuously by the service to automatically deduce that a trailer is physically coupled with a vehicle. In other embodiments, the mechanisms may be performed in response to a trigger. For example, scores may be determined for a trailer and set of vehicles when it is determined that the trailer started moving. In another example, scores may be calculated for a vehicle and a set of trailers when it is determined that the vehicle started moving.

The operations in the flow diagrams of FIGS. 3-6 will be described with reference to the exemplary embodiments of FIGS. 1A-2D. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
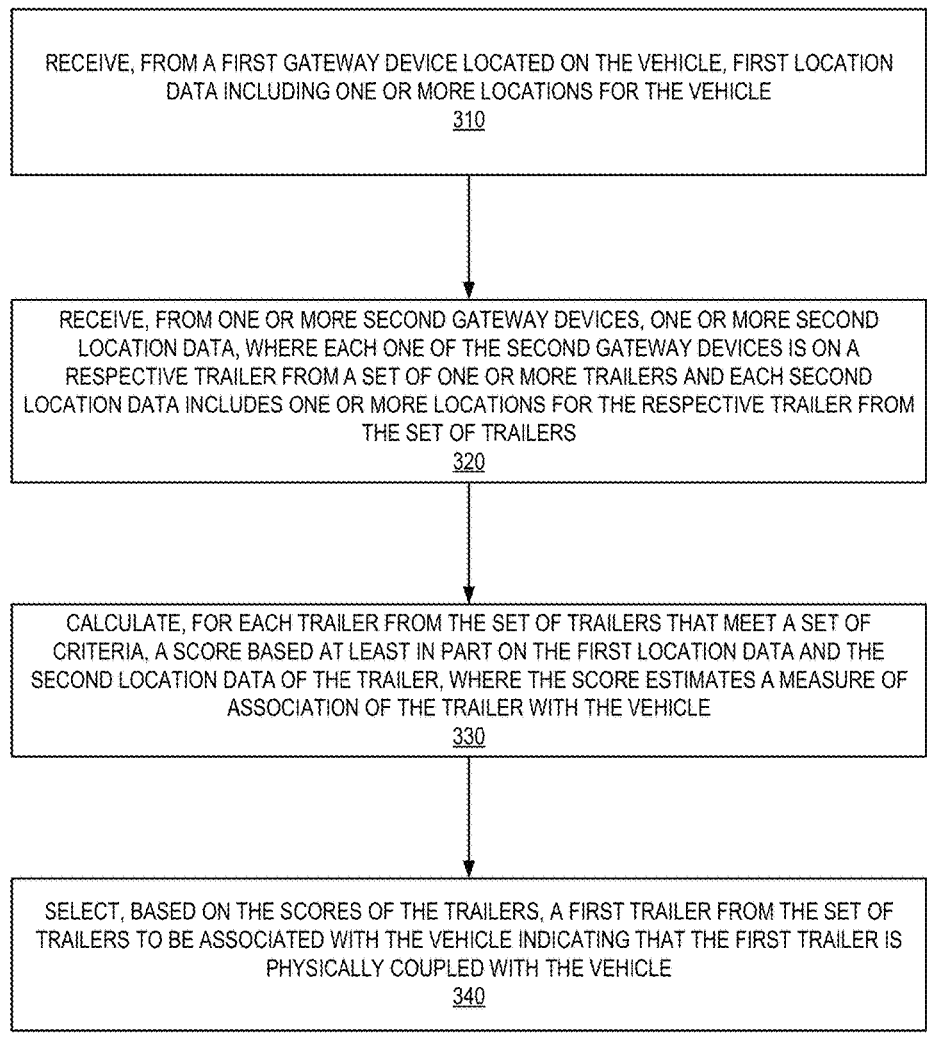
FIG. 3 illustrates a flow diagram of exemplary operations for automatically deducing that a trailer is physically coupled with a vehicle having a trailer hitch in accordance with some embodiments.

FIG. 3 illustrates a flow diagram of exemplary operations for automatically deducing that a trailer is physically coupled with a vehicle having a trailer hitch in accordance with some embodiments. At operation 310, the management server 140 receives, from a first gateway device (e.g., 115) located on the vehicle (e.g., 110), first location data including one or more locations for the vehicle. At operation 320, the management server 140 receives, from one or more second gateway devices (e.g., 125A, 125B), one or more second location data. Each one of the second gateway devices is on a respective trailer (e.g., 120A, 120B) from a set of one or more trailers and each second location data includes one or more locations for the respective trailer from the set of trailers. The management server 140, calculates, for each trailer from the set of trailers that meet a set of criteria, a score based at least in part on the first location data and the second location data of the trailer. The score estimates a measure of association of the trailer with the vehicle. The management server 140 selects, based on the scores of the trailers, a first trailer from the set of trailers to be associated with the vehicle indicating that the first trailer is physically coupled with the vehicle.

FIG. 4A illustrates a flow diagram of exemplary operations for receiving data from a gateway device located on the vehicle, in accordance with some embodiments. In some embodiments, at operation 210, the location data received from the first gateway device 115 may include a plurality of locations recorded for the vehicle at the first gateway device at different times of a first time interval (operation 410). In some embodiments, the first location data also includes one or more speed measures for the vehicle 110.

In some embodiments, additional parameters can be received at the management server 140 from the gateway device 115. At operation 420, the management server 140 receives, from the first gateway device, a first set of one or more identifiers of trailers detected to be in proximity of the vehicle based on a short range wireless network protocol. At operation 425, the management server 140 receives from the first gateway device an indication that the vehicle is coupled with a trailer.

FIG. 4B illustrates a flow diagram of exemplary operations for receiving data from a gateway device located on the trailer, in accordance with some embodiments. In some embodiments, at operation 210, the location data received from the second gateway device 125A may include a plurality of locations recorded for each trailer at a second gateway device at different times of a second time interval (operation 430). In some embodiments, the second location data also includes one or more speed measures for the trailer. At operation 440, the management server 140 receives, from each one of the second gateway devices, a second set of one or more identifiers of vehicles detected to be in proximity of a trailer based on the short range wireless network protocol. In some embodiments, the management server 140 receives, at operation 445, an indication of whether the trailer is coupled with an external power source.

FIG. 5 illustrates a flow diagram of exemplary operations for calculating scores for one or more trailers and selecting a trailer based on the scores in accordance with some embodiments. In some embodiments, the management server 140 calculates at operation 230, the score for a trailer by determining, at operation 510, for each trailer the score is based on a plurality of distances. Each distance is determined between one of the plurality of locations for the vehicle and one of the plurality of locations for the trailer, and where the one of the plurality of locations for the vehicle was recorded within a threshold amount of time of when the one of the plurality of locations for the trailer was recorded. In some embodiments, the determination of the distances is performed as described with reference to FIG. 2C.

In some embodiments, the score for each trailer is determined, at operation 515, based on the calculated distances. In some embodiments, the score of the first trailer 120A indicates, operation 520, that each one of the distances calculated for the first trailer 120A are within a predetermined threshold resulting in the selection of the first trailer 120A to be associated with the trailer. In other embodiments, the score of the first trailer 120A indicates that a subset of the distances calculated for the first trailer 120A are within a predetermined threshold resulting in the selection of the first trailer 120A to be associated with the trailer.

Figure 6:
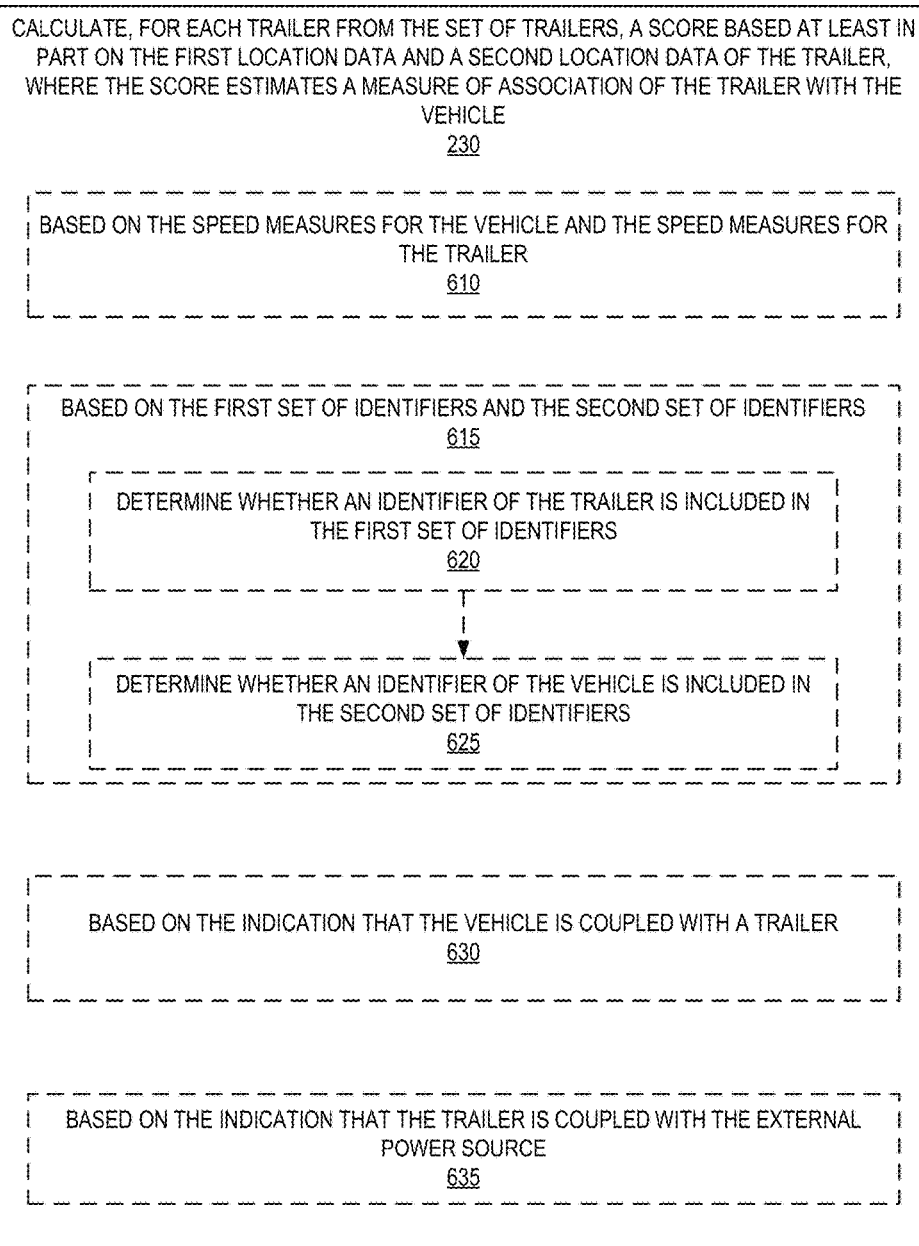
FIG. 6 illustrates a flow diagram of exemplary operations for calculating scores for one or more trailers in accordance with some embodiments.

FIG. 6 illustrates a flow diagram of exemplary operations for calculating scores for one or more trailers in accordance with some embodiments. In some embodiments, the operation 230 of calculating a score for a trailer also based on speed measures for the vehicle and for the trailer received at the management server 140. In some embodiments, the operation 230 is also based on the set of identifiers recorded by the gateway device of the vehicle or the gateway device of the trailer through a short range network protocol. In these embodiments, the operation 230 may further include determining, at operation 620, whether an identifier of the trailer is within the set of identifiers detected by the gateway device of the vehicle. The operation 230 may also include determining, at operation 625, whether an identifier of the vehicle is within the set of identifiers detected by the gateway device of trailer through the short range network protocol. In some embodiments, the operation 230 is also based on an indication that the vehicle is coupled with a trailer (operation 630). In some embodiments, the operation 230 is also based on an indication that the trailer is coupled to an external power sources (operation 635).

The association of the trailer 120A and the vehicle 110 is set for a determined period of time indicating that the trailer 120A is physically coupled with the vehicle 110. In some embodiments, the association of the vehicle and trailer can remain in effect until an event is detected indicating that the trailer has been unplugged from the vehicle. Several events can be used to determine that the trailer is unplugged, for example, the determination that the vehicle is associated with another trailer can be an indication that the association with the first trailer is no longer valid. In another example, the determination that the trailer has been dropped/delivered at the destination can be an indication that the association is no longer valid. Several other events may be used by the management server 140 to determine that the association between the trailer and the vehicle has ended. Once the association of a trailer (e.g., trailer 120A) with a vehicle (e.g., vehicle 110) is established indicating that the vehicle is physically coupled with the trailer 120A, several actions can be automatically taken by the management server 140.

Figure 7:
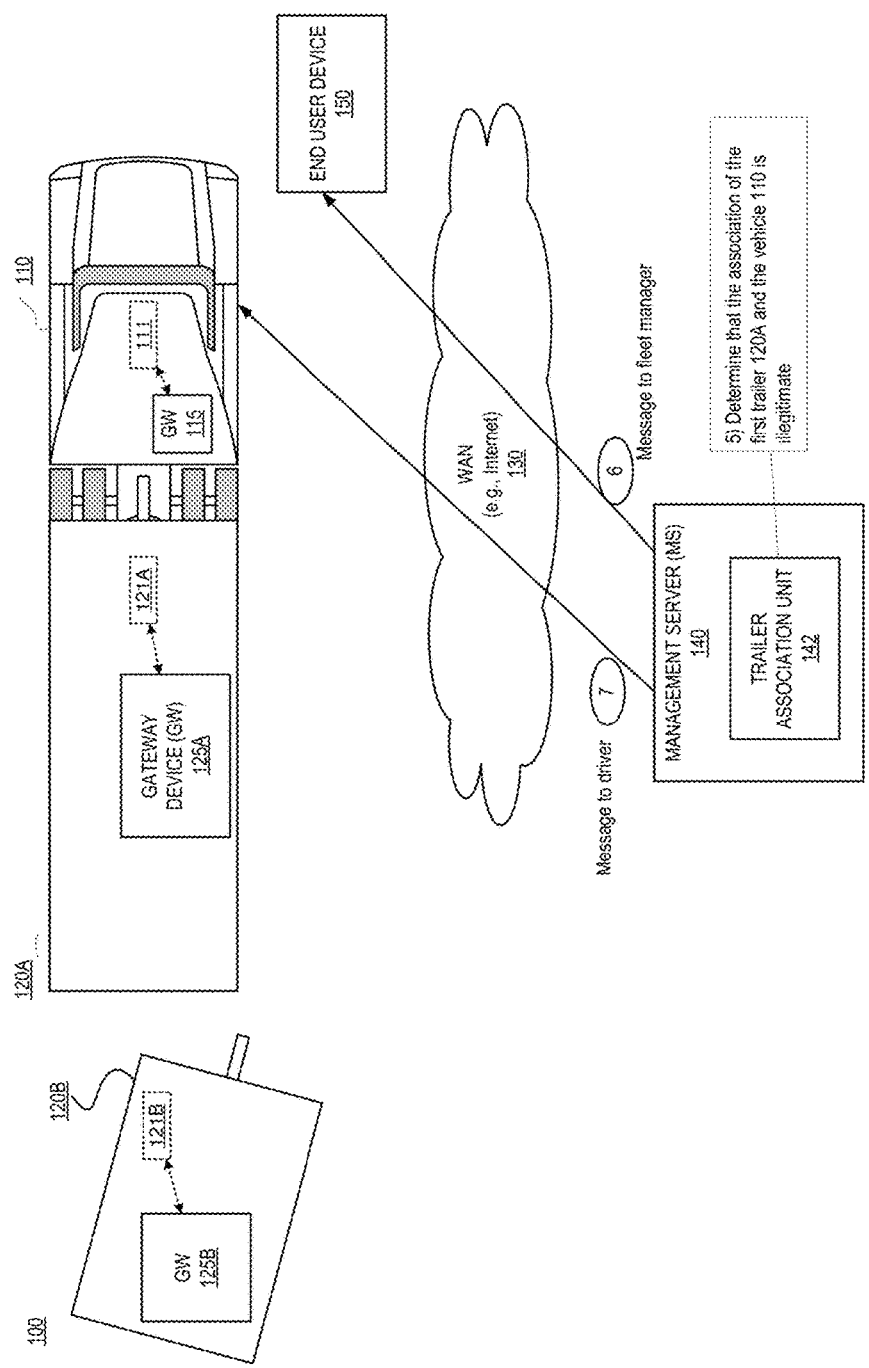
FIG. 7 illustrates a block diagram of exemplary operations for determining that an association of a trailer with a vehicle is illegitimate in accordance with some embodiments.

FIG. 7 illustrates a block diagram of exemplary operations for determining that an association of a trailer with a vehicle is illegitimate in accordance with some embodiments. For example, at operation 5, the management server 140 determines that the association is illegitimate. Once it is determined that the association is illegitimate, the management server 140 transmits an alert to the administrator of the fleet (operation 6) and/or to the driver (7) of the vehicle 110. This alert is immediately received by at least one of the parties which can quickly act.

The operations in the flow diagrams of FIG. 8 will be described with reference to the exemplary embodiments of FIG. 7. However, it should be understood that the operations of the flow diagram can be performed by embodiments of the invention other than those discussed with reference to FIG. 7, and the embodiments of the invention discussed with reference to FIG. 7 can perform operations different than those discussed with reference to the flow diagram.

Figure 8:
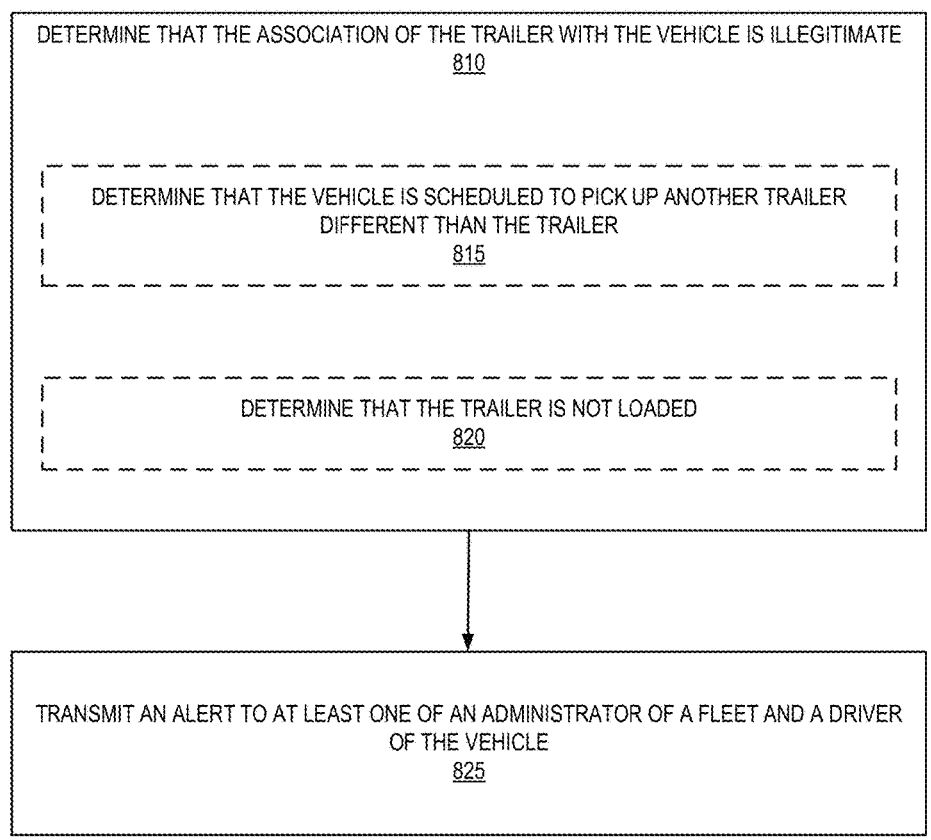
FIG. 8 illustrates a flow diagram of exemplary operations for determining that an association of a trailer with a vehicle is illegitimate in accordance with some embodiments.

FIG. 8 illustrates a flow diagram of exemplary operations for determining that an association of a trailer with a vehicle is illegitimate in accordance with some embodiments. Once the association of a trailer (e.g., trailer 120A) with a vehicle (e.g., vehicle 110) is established indicating that the vehicle is physically coupled with the trailer 120A, several actions can be taken by the management server 140. For example, at operation 810, the management server 140 determines whether the association is illegitimate. In some embodiments, the determination can be performed by determining, at operation 815, that the vehicle is scheduled to pick up a different trailer (e.g., trailer 120B). In some embodiments, the determination that the vehicle is scheduled to pick up a different trailer is performed by looking up a vehicles database at the management server 140 that includes for each vehicle a scheduled route with information about trailers that are to be picked up and locations that are to be reached by the vehicle during a pre-determined period of time. Alternatively, in other embodiments, the determination that the association is illegitimate can be performed by determining, at operation 820, that the trailer is not loaded with an expected cargo. In some embodiments, the determination that the trailer is not leaded with the expected cargo is performed by looking up a trailers database and determining a status of the trailer (e.g., loaded, not loaded).

Once it is determined that the association is illegitimate, the management server 140 transmits an alert to one of the administrator of the fleet and/or to the driver of the vehicle. In some embodiments, an alert can be sent via a message to the administrator/driver such as a text message, an email, a voicemail, a notification, etc. This alert is immediately received by at least one of the parties which can quickly act.

The embodiments of the present invention present several advantages with respect to prior approaches for deducing that a trailer is coupled with a vehicle. The embodiments presented herein provide mechanisms for dynamically detecting that a trailer and vehicle are physically coupled. Some of the embodiments herein use a dynamic global position information determined over an interval of time for the trailer and the vehicle to obtain a score that estimates a likelihood of a trailer being physically coupled with a vehicle. In some embodiments, additional parameters such as localized information (e.g., identifiers detected via a short range network protocol), and information regarding the state of each one of the trailer or the vehicle (e.g., the vehicle is coupled to a trailer, a trailer is coupled to an external source, etc.) can be used to enhance the score and obtain a more accurate estimation of the likelihood that the vehicle and the trailer are physically coupled. The determination of an association of a trailer and a vehicle (indicating that the trailer is physically coupled with a vehicle) can be seen as a determination that a hook event has occurred. This association is performed remotely from the physical site at which both the trailer and the vehicle are location and is performed without the need for the intervention of a person located at the site. The association can then be used to detect legitimate or illegitimate events and to alert the several parties involved (e.g., a driver of the vehicle, an administrator of the fleet, etc.). The embodiments described herein provide near real time feedback to the driver of the vehicle and/or an operator of the fleet.

Architecture

The gateway devices and the management server described with reference to FIGS. 1-8 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 9:
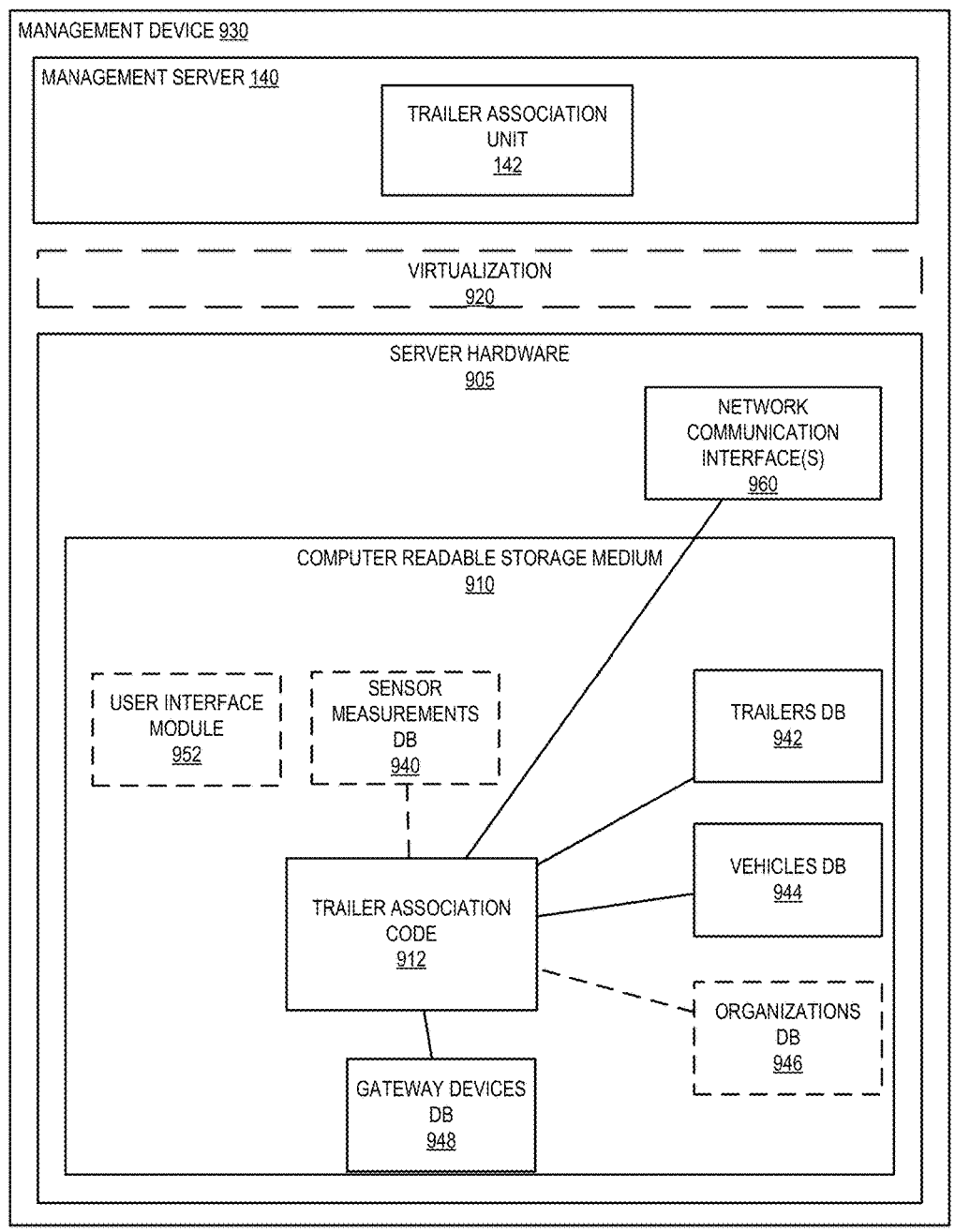
FIG. 9 illustrates a block diagram for an exemplary server management that can be used in some embodiments.

FIG. 9 illustrates a block diagram for an exemplary server management that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and gateway devices managed by the same management server.

According to one embodiment, management server 140 is implemented on a server device 930 which includes server hardware 905. Server hardware 905 includes network communication interfaces 960 coupled with a computer readable storage medium 910. The computer readable storage medium 910 includes trailer association code. The computer readable storage medium 910 includes trailer database 942 (including data associated with one or more trailers deployed as part of a fleet of vehicles), vehicles database 944 (including information regarding the gateway devices), an organizations database 946 (including information regarding the organizations to which the gateway devices, the vehicles, or the trailers belong); a gateway devices database 948 (including information regarding the gateway devices).

While one embodiment does not implement virtualization, alternative embodiments may use different forms of virtualization—represented by a virtualization layer 920. In these embodiments, the management server 140 and the hardware that executes it form a virtual management server which is a software instance of the modules stored on the computer readable storage medium 910.

Figure 10:
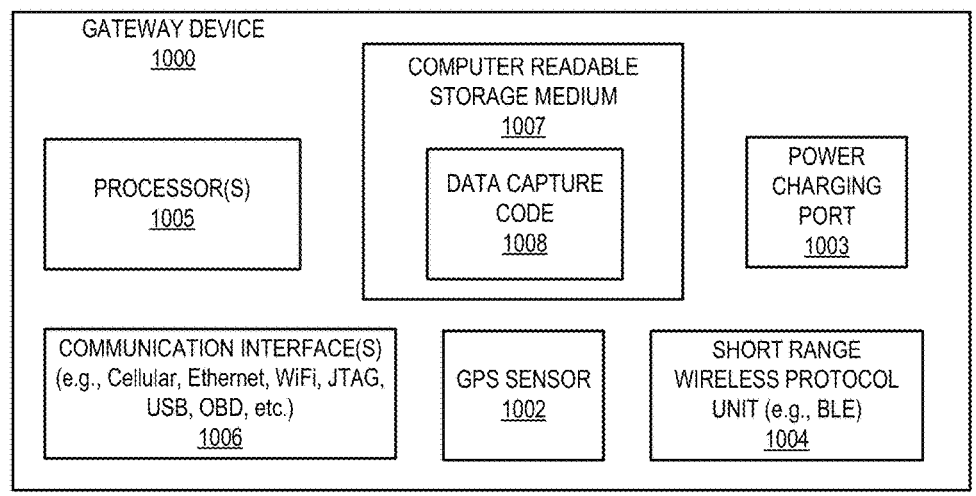
FIG. 10 illustrates a block diagram of an exemplary gateway device that can be used in some embodiments.

FIG. 10 illustrates a block diagram of an exemplary gateway device that can be used in some embodiments. Gateway device 1000 includes one or more processors 1005 and connected system components (e.g., multiple connected chips). The gateway device 1000 includes computer readable storage medium 1010, which is coupled to the processor(s) 1005. The computer readable storage medium 1010 may be used for storing data, metadata, and programs for execution by the processor(s) 1005. For example, the depicted computer readable storage medium 1010 may store data capture code 1008 that, when executed by the processor(s) 1005, causes the gateway device 1000 (e.g., gateway device 115, 125A, 125B) to transmit the data to the management server 140.

The gateway device 1000 also includes one or more communication interfaces 1006, which are provided to allow a user to provide input to, receive output from, and otherwise transfer data to and from the system. Exemplary Input/Output devices and interfaces 1206 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway device 1000 with another device, external component, or a network and receive stored instructions, data, tokens, etc. It will be appreciated that one or more buses may be used to interconnect the various components shown in FIG. 10.

It will be appreciated that additional components, not shown, may also be part of the gateway device 1000, and, in certain embodiments, fewer components than that shown in FIG. 10 may also be used in a gateway device 1000.

While some components of the gateway device, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a management server device located in the cloud, of automatically deducing a trailer is physically coupled with a vehicle having a trailer hitch, the method comprising:
  receiving, from a first gateway device located on the vehicle, first location data including one or more locations for the vehicle;
  receiving, from two or more second gateway devices, two or more second location data, wherein each one of the second gateway devices is located on a respective trailer from a set of two or more trailers and each second location data includes one or more locations for the respective trailer from the set of trailers;
  receiving from the first gateway device an indication that the vehicle is coupled with a trailer, wherein the indication does not indicate an identity of the trailer that is connected;
  calculating, for each trailer from the set of trailers, a score based at least in part on the first location data and the second location data of the trailer and further based on the indication that the vehicle is coupled with a trailer, wherein the score estimates a measure of how likely the trailer is to be physically coupled with the vehicle; and
  selecting, based on the scores of the trailers, a first trailer from the set of trailers to be associated with the vehicle indicating that the first trailer is physically coupled with the vehicle.

2. The method of claim 1, wherein the one or more locations for the vehicle are a plurality of locations recorded for the vehicle by the first gateway device at different times of a first time interval, and for each trailer from the set of trailers, the one or more locations for the trailer are a plurality of locations recorded for the trailer at different times of a second interval of time.

3. The method of claim 2, wherein the calculating, for each trailer, the score is based on a plurality of distances, wherein each distance is determined between one of the plurality of locations for the vehicle and one of the plurality of locations for the trailer, and wherein the one of the plurality of locations for the vehicle was recorded within a threshold amount of time of when the one of the plurality of locations for the trailer was recorded.

4. The method of claim 3, wherein the score of the first trailer indicates that each one of the distances calculated for the first trailer are within a predetermined threshold.

5. The method of claim 1, wherein the first location data also includes one or more speed measures for the vehicle, and each second location data also includes one or more speed measures for the trailer, and wherein calculating the score, for each trailer, is further based on the speed measures for the vehicle and the speed measures for the trailer.

6. The method of claim 1 further comprising:
  receiving, from the first gateway device, a first set of one or more identifiers of trailers detected to be in proximity of the vehicle based on a short range wireless network protocol;
  receiving, from each one of the second gateway devices, a second set of one or more identifiers of vehicles detected to be in proximity of a trailer based on the short range wireless network protocol; and
  wherein the calculating the score includes:
    determining whether an identifier of the trailer is included in the first set of identifiers; and
    determining whether an identifier of the vehicle is included in the second set of identifiers.

7. The method of claim 1, wherein the calculating, for each trailer, the score is further based on an indication of whether the trailer is coupled with an external power source.

8. The method of claim 1, further comprising:
in response to determining that the association of the first trailer with the vehicle is illegitimate, transmitting an alert to at least one of a fleet manager and a driver of the vehicle.

9. The method of claim 1, wherein the set of trailers is a first set of trailers, and the method further comprises:
receiving third location data from one or more third gateway devices, wherein each of the third location data includes one or more locations for a respective trailer from a second set of trailers that is different from the first set of trailers; and
prior to the calculating, determining that each one from the first set of trailers meet a set of one or more criteria and none of the second set of trailers meets the set of criteria, wherein the set of criteria includes a distance between at least one of the locations of the vehicle and at least one of the locations of the trailer is within a threshold proximity, an identifier of the vehicle is included in a set of identifiers detected by the second gateway device of the trailer via a short range wireless network protocol, an identifier of the trailer is included in a set of identifiers detected by the first gateway device of the vehicle via the short range wireless network protocol, and a speed measure of the trailer and a speed measure of the vehicle are non-zero, wherein the speed measure of the trailer was recorded within a threshold amount of time of when the speed measure of the vehicle was recorded.

10. The method of claim 1, wherein the vehicle is scheduled to pick up another trailer that is different from the first trailer and selecting the first trailer results in identification of the first trailer as an illegitimate trailer.

11. A management server device located in the cloud for automatically deducing a trailer is physically coupled with a vehicle having a trailer hitch, the management server device comprising:
a non-transitory computer readable storage medium to store instructions; and
a processor coupled with the non-transitory computer readable storage medium to process the stored instructions to:
receive, from a first gateway device located on the vehicle, first location data including one or more locations for the vehicle;
receive, from two or more second gateway devices, two or more second location data, wherein each one of the second gateway devices is located on a respective trailer from a set of two or more trailers and each second location data includes one or more locations for the respective trailer from the set of trailers;
receive from the first gateway device an indication that the vehicle is coupled with a trailer, wherein the indication does not indicate an identity of the trailer that is connected;
calculate, for each trailer from the set of trailers, a score based at least in part on the first location data and the second location data of the trailer and further based on the indication that the vehicle is coupled with a trailer, wherein the score estimates a measure of how likely the trailer is to be physically coupled with the vehicle; and
select, based on the scores of the trailers, a first trailer from the set of trailers to be associated with the vehicle indicating that the first trailer is physically coupled with the vehicle.

12. The management server device of claim 11, wherein the one or more locations for the vehicle are a plurality of locations recorded for the vehicle by the first gateway device at different times of a first time interval, and for each trailer from the set of trailers, the one or more locations for the trailer are a plurality of locations recorded for the trailer at different times of a second interval of time.

13. The management server device of claim 12, wherein to calculate, for each trailer, the score is based on a plurality of distances, wherein each distance is determined between one of the plurality of locations for the vehicle and one of the plurality of locations for the trailer, and wherein the one of the plurality of locations for the vehicle was recorded within a threshold amount of time of when the one of the plurality of locations for the trailer was recorded.

14. The management server device of claim 13, wherein the score of the first trailer indicates that each one of the distances calculated for the first trailer are within a predetermined threshold.

15. The management server device of claim 11, wherein the first location data also includes one or more speed measures for the vehicle, and each second location data also includes one or more speed measures for the trailer, and wherein to calculate the score, for each trailer, is further based on the speed measures for the vehicle and the speed measures for the trailer.

16. The management server device of claim 11, wherein the processor is further to:
receive, from the first gateway device, a first set of one or more identifiers of trailers detected to be in proximity of the vehicle based on a short range wireless network protocol;
receive, from each one of the second gateway devices, a second set of one or more identifiers of vehicles detected to be in proximity of a trailer based on the short range wireless network protocol; and
wherein to calculate the score includes to:
determine whether an identifier of the trailer is included in the first set of identifiers; and
determine whether an identifier of the vehicle is included in the second set of identifiers.

17. The management server device of claim 11, wherein to calculate, for each trailer, the score is further based on an indication of whether the trailer is coupled with an external power source.

18. The management server device of claim 11, wherein the processor is further to:
in response to determining that the association of the first trailer with the vehicle is illegitimate, transmit an alert to at least one of a fleet manager and a driver of the vehicle.

19. The management server device of claim 11, wherein the set of trailers is a first set of trailers, and the processor is further to:
receive third location data from one or more third gateway devices, wherein each of the third location data includes one or more locations for a respective trailer from a second set of trailers that is different from the first set of trailers; and
prior to calculating, determine that each one from the first set of trailers meet a set of one or more criteria and none of the second set of trailers meets the set of criteria, wherein the set of criteria includes a distance between at least one of the locations of the vehicle and at least one of the locations of the trailer is within a threshold proximity, an identifier of the vehicle is included in a set of identifiers detected by the second gateway device of the trailer via a short range wireless network protocol, an identifier of the trailer is included in a set of identifiers detected by the first gateway device of the vehicle via the short range wireless network protocol, and a speed measure of the trailer and a speed measure of the vehicle are non-zero, wherein the speed measure of the trailer was recorded within a threshold amount of time of when the speed measure of the vehicle was recorded.

20. A non-transitory computer readable storage medium that provide instructions, which when executed by a processor of a management server device located in the cloud, cause said processor to perform operations comprising:

receiving, from a first gateway device located on a vehicle, first location data including one or more locations for the vehicle;

receiving, from two or more second gateway devices, two or more second location data, wherein each one of the second gateway devices is located on a respective trailer from a set of two or more trailers and each second location data includes one or more locations for the respective trailer from the set of trailers;

receiving from the first gateway device an indication that the vehicle is coupled with a trailer, wherein the indication does not indicate an identity of the trailer that is connected;

calculating, for each trailer from the set of trailers, a score based at least in part on the first location data and the second location data of the trailer and further based on the indication that the vehicle is coupled with a trailer, wherein the score estimates a measure of how likely the trailer is to be physically coupled with the vehicle; and selecting, based on the scores of the trailers, a first trailer from the set of trailers to be associated with the vehicle indicating that the first trailer is physically coupled with the vehicle.

21. The non-transitory computer readable storage medium of claim 20, wherein the one or more locations for the vehicle are a plurality of locations recorded for the vehicle by the first gateway device at different times of a first time interval, and for each trailer from the set of trailers, the one or more locations for the trailer are a plurality of locations recorded for the trailer at different times of a second interval of time.

22. The non-transitory computer readable storage medium of claim 21, wherein the calculating, for each trailer, the score is based on a plurality of distances, wherein each distance is determined between one of the plurality of locations for the vehicle and one of the plurality of locations for the trailer, and wherein the one of the plurality of locations for the vehicle was recorded within a threshold amount of time of when the one of the plurality of locations for the trailer was recorded.

23. The non-transitory computer readable storage medium of claim 22, wherein the score of the first trailer indicates that each one of the distances calculated for the first trailer are within a predetermined threshold.

24. The non-transitory computer readable storage medium of claim 20, wherein the first location data also includes one or more speed measures for the vehicle, and each second location data also includes one or more speed measures for the trailer, and wherein calculating the score, for each trailer, is further based on the speed measures for the vehicle and the speed measures for the trailer.

25. The non-transitory computer readable storage medium of claim 20, wherein the operations further comprise:

receiving, from the first gateway device, a first set of one or more identifiers of trailers detected to be in proximity of the vehicle based on a short range wireless network protocol;

receiving, from each one of the second gateway devices, a second set of one or more identifiers of vehicles detected to be in proximity of a trailer based on the short range wireless network protocol; and wherein the calculating the score includes:
determining whether an identifier of the trailer is included in the first set of identifiers; and
determining whether an identifier of the vehicle is included in the second set of identifiers.

26. The non-transitory computer readable storage medium of claim 20, wherein the calculating, for each trailer, the score is further based on an indication of whether the trailer is coupled with an external power source.

27. The non-transitory computer readable storage medium of claim 20, wherein the operations further comprise:

in response to determining that the association of the first trailer with the vehicle is illegitimate, transmitting an alert to at least one of a fleet manager and a driver of the vehicle.

28. The non-transitory computer readable storage medium of claim 20, wherein the set of trailers is a first set of trailers, and the operations further comprise:

receiving third location data from one or more third gateway devices, wherein each of the third location data includes one or more locations for a respective trailer from a second set of trailers that is different from the first set of trailers; and prior to said calculating, determining that each one from the first set of trailers meet a set of one or more criteria and none of the second set of trailers meets the set of criteria, wherein the set of criteria includes a distance between at least one of the locations of the vehicle and at least one of the locations of the trailer is within a threshold proximity, an identifier of the vehicle is included in a set of identifiers detected by the second gateway device of the trailer via a short range wireless network protocol, an identifier of the trailer is included in a set of identifiers detected by the first gateway device of the vehicle via the short range wireless network protocol, and a speed measure of the trailer and a speed measure of the vehicle are non-zero, wherein the speed measure of the trailer was recorded within a threshold amount of time of when the speed measure of the vehicle was recorded.

* * * * *